United States Patent
Ogawa

(10) Patent No.: US 10,988,624 B2
(45) Date of Patent: Apr. 27, 2021

(54) ULTRAVIOLET ABSORBING FILM PROVIDED ON A SURFACE OF AN OPTICAL ELEMENT AND USE THEREOF FOR REDUCING INTERNAL REFLECTIONS

(71) Applicant: HOYA CANDEO OPTRONICS CORPORATION, Toda (JP)

(72) Inventor: Shinichi Ogawa, Toda (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 15/280,196

(22) Filed: Sep. 29, 2016

(65) Prior Publication Data
US 2017/0090081 A1   Mar. 30, 2017

(30) Foreign Application Priority Data

Sep. 30, 2015 (JP) ................................. 2015-194089
Sep. 20, 2016 (JP) ................................. 2016-182844

(51) Int. Cl.
*G02B 5/08* (2006.01)
*G02B 5/20* (2006.01)
(Continued)

(52) U.S. Cl.
CPC .................. *C09D 7/61* (2018.01); *C09D 1/00* (2013.01); *C09D 7/00* (2013.01); *G02B 5/208* (2013.01)

(58) Field of Classification Search
CPC .......... C09D 1/00; C09D 7/00; C09D 7/1216; C09D 11/101; C09D 5/32; C09D 5/084;
(Continued)

(56) References Cited

U.S. PATENT DOCUMENTS 2,944,912 A   7/1960   Kopley et al.
3,904,421 A   9/1975   Shimizu et al.
(Continued)

FOREIGN PATENT DOCUMENTS

EP   0096526 A2   12/1983
EP   0967182 A1   12/1999
(Continued)

OTHER PUBLICATIONS

Naofumi Uekawa et al, "Iron oxide films of a spinel structure from thermal decomposition of metal ion citrate complex ", Journal of Materials Research, vol. 14, No. 05, May 31, 1999 (May 31, 1999), pp. 2002-2006, https://doi.org/10.1557/JMR.1999.0270.
(Continued)

*Primary Examiner* — Mustak Choudhury
(74) *Attorney, Agent, or Firm* — Rabin & Berdo, P.C.

(57) ABSTRACT

An ultraviolet absorbing film, a light absorbing film, an optical element, an optical unit, and a light illuminating apparatus are disclosed. The ultraviolet absorbing film is provided on at least one surface of an optical element to reduce internal reflections therein and includes a transition metal oxide of a transition metal selected from the group consisting of Ti, V, Cr, Mn, Fe, Co, Ni, Cu, Zn, Ce, and combinations thereof that contains no organic constituent. The ultraviolet absorbing film is formed by a process including applying an ultraviolet absorbing paint including an oxide precursor of the transition metal on at least one surface of the optical element; and a binder component or a solvent in which the oxide precursor is dissolved; and heating the coating to a predetermined temperature at which the oxide precursor forms the transition metal oxide and the binder or the solvent substantially completely decomposes or volatilizes.

16 Claims, 14 Drawing Sheets

(51) Int. Cl.
*F21V 9/04* (2018.01)
*F21V 9/06* (2018.01)
*C09D 7/61* (2018.01)
*C09D 1/00* (2006.01)
*C09D 7/00* (2018.01)

(58) Field of Classification Search
CPC .... C08K 3/01; C09C 1/22; C09C 1/40; C09C 1/0009; C01G 49/0036; C03C 17/007; C03C 17/25; C03C 17/3417; C03C 17/008; C03C 17/02; C03C 17/34; C03C 17/36; C03C 17/366; C03C 17/3681; C03C 2217/23; G02B 5/208; G02B 5/282; G02B 1/115; G02B 1/208; G02B 5/26; G02B 5/206; G02B 1/005; G02B 1/11; G02B 1/18; G03F 7/0035; G03F 7/2016; B32B 37/14; B32B 38/0004
USPC .......... 359/359–361; 106/14.05, 14.39, 459, 106/461, 287.17, 287.18; 252/589; 427/164, 169, 372.2, 402; 428/500, 697, 428/428, 328, 329, 426, 432, 434, 701, 428/702

See application file for complete search history.

(56) References Cited

U.S. PATENT DOCUMENTS

| | | | |
|---|---|---|---|
| 4,285,726 A | 8/1981 | Hund et al. | |
| 5,942,331 A * | 8/1999 | Miyauchi | C03C 17/007 428/328 |
| 6,200,680 B1 * | 3/2001 | Takeda | A61K 8/27 423/111 |
| 2005/0214556 A1 * | 9/2005 | Nishimi | C08K 3/01 428/500 |
| 2007/0237943 A1 * | 10/2007 | Wakizaka | C09D 7/69 428/328 |
| 2008/0024863 A1 * | 1/2008 | Yamada | G02B 1/115 359/507 |

FOREIGN PATENT DOCUMENTS

| | | |
|---|---|---|
| GB | 1319912 A | 6/1973 |
| JP | S62223703 A | 10/1987 |
| JP | H05125302 A | 5/1993 |
| JP | H8-281860 A | 10/1996 |
| JP | H11-349351 A | 12/1999 |
| JP | 2000-119043 A | 4/2000 |
| JP | 2003-522092 A | 7/2003 |
| JP | 2003327431 A | 11/2003 |
| JP | 2014-021231 A | 2/2014 |
| WO | WO 01/58681 A1 | 8/2001 |
| WO | WO 2015/037514 A1 | 3/2015 |

OTHER PUBLICATIONS

English translation of Japanese Office Action dated Oct. 18, 2019.

\* cited by examiner

ULTRAVIOLET ABSORBING FILM PROVIDED ON A SURFACE OF AN OPTICAL ELEMENT AND USE THEREOF FOR REDUCING INTERNAL REFLECTIONS

TECHNICAL FIELD

The present disclosure relates to an ultraviolet absorbing paint, an ultraviolet absorbing film, a light absorbing film, an optical element, optical unit and a light illuminating apparatus.

BACKGROUND ART

Generally, an optical element such as a lens or a prism used in optical equipment such as a camera or a microscope may generate stray light by the incidence of light entering the optical element on a peripheral region such as a ridge of the optical element and a circumferential edge of the lens (side surface of the lens) or reflection of the incident light on an inner surface such as a circumferential edge, and when the stray light gets mixed with the original irradiated light, a flare or ghost occurs in a captured image, degrading the optical properties of the optical equipment.

To prevent the stray light, applying a black paint having a function for preventing internal reflection to the peripheral region such as a ridge and a circumferential edge of the optical element to form a coating film of black paint is known.

For the black paint having a function for preventing internal reflection, inclusion of a dispersant and a solvent including, for example, metal oxide such as ferric oxide, carbon black, binder resin, a phthalocyanine compound, and a polymer-based dispersant is proposed (see Patent Literature 1 (Japanese Patent Publication No. 2014-21231)).

RELATED LITERATURES

Patent Literature

Japanese Patent Publication No. 2014-21231

Non-Patent Literature

DISCLOSURE

Technical Problem

SUMMARY OF THE INVENTION

Problem to be Solved by the Invention

The black paint of Patent Literature 1 teaching includes metal oxide particles and carbon black particles as light absorbing components, with each particle dispersed in a vehicle (the binder resin and the solvent), making it difficult to manufacture in a simple and convenient manner due to tedious dispersion processing of each particle, and each particle is susceptible to agglomeration or sedimentation after manufacture, leading to heterogeneity, therefore, there is a challenge of improving a short pot life (working life).

Furthermore, earlier anti-reflective paints including the black paint of Patent Literature 1 teaching target visible light or infrared light, and most of them is used under the environment in which light intensity is not too high, while recently, there is a trend toward the use of ultraviolet light having high light intensity, so stray light to be absorbed increases in optical energy and an amount of light.

In case that a coating film is formed on the surface of an optical element using the black paint of Patent Literature 1 teaching, a solvent volatilizes and disappears, while organics such as the binder resin or the dispersant remain, so in case that ultraviolet light is incident on the optical element, the organics are deteriorated, and besides, because carbon black is also a carbonaceous material, in case that a high intensity of ultraviolet light is incident, carbon black is susceptible to deterioration.

Light absorbed by the coating film is converted to heat, but in case that the intensity of incident light is high, deterioration of the binder resin or the dispersant is accelerated, causing cracking or delamination of the coating film, and carbon black deteriorates and is apt to discolor.

For example, for a LED die with 1 mm width and 1 mm length for an ultraviolet LED (UV-LED) used as a light source for curing an ultraviolet curing resin or an ultraviolet curing ink, a LED which supplies 3 W power and emits 1 W ultraviolet light at 365 nm wavelength is used, but in this case, an amount of irradiated light is 1 W/mm$^2$ which is equivalent to 30,000-50,000 times larger than an amount of ultraviolet light included in solar light. By this reason, the black paint having a function for preventing internal reflection used in a light illuminating apparatus is required to have the resistance to strong ultraviolet light.

Furthermore, among the 3 W power inputted to the ultraviolet LED, 2 W is converted to thermal energy, increasing the temperature of the LED die itself, so the black paint having a function for preventing internal reflection is required to have ultraviolet resistance as well as resistance to heat (temperature).

To solve the technical problem, upon review, the inventors designed to form an ultraviolet absorbing film with no organics as the coating film.

It was suggested that colored low melting point glass or low melting point glass including an inorganic pigment is used as a material for forming the ultraviolet absorbing film, but when a coating film is formed using these materials, the coating film is thick, for example, a few hundreds of μm thick, so a processing tolerance of the optical element such as a lens is about ±0.05 to 0.10 mm (50 to 100 μm), and if the coating film is thick, the coating film cannot be fitted into a desired place or alignment is made difficult.

Furthermore, unless a difference between the thermal expansion coefficient of the low melting point glass and the thermal expansion coefficient of the optical element such as a lens or a prism is controlled within a predetermined range, a crack occurs in the optical element or the low melting point glass layer (coating film) or the low melting point glass layer is peeled off, making it difficult to continuously use optical equipment having the optical element.

In this context, the present disclosure was intended to provide an ultraviolet absorbing paint for forming a coating film that ensures the outstanding durability while markedly inhibiting the generation of stray light in the state of a thin film, and to providing an ultraviolet absorbing film, a light absorbing film, an optical element, an optical unit and a light illuminating apparatus.

Technical Solution

To achieve the object, upon review, the inventors discovered that the technical problem could be solved by an ultraviolet absorbing paint including an oxide precursor of at least one transition metal selected from Ti, V, Cr, Mn, Fe, Co, Ni, Cu, Zn and Ce, and devised the invention based on the discovery.

That is, the present disclosure is directed to providing:

(1) an ultraviolet absorbing paint characterized by including an oxide precursor of at least one transition metal selected from Ti, V, Cr, Mn, Fe, Co, Ni, Cu, Zn and Ce, (2) an ultraviolet absorbing paint described in (1) wherein the oxide precursor of the transition metal is a metal salt, a metal acid salt, or an organic metal compound of at least one transition metal selected from Ti, V, Cr, Mn, Fe, Co, Ni, Cu, Zn and Ce, (3) an ultraviolet absorbing paint described in (1) or (2) wherein the oxide precursor of the transition metal is present in 0.5-20.0 mass %, in transition metal oxide conversion, (4) an ultraviolet absorbing paint described in any of (1) to (3) further including at least one selected from a silicon oxide precursor and an aluminum oxide precursor, (5) an ultraviolet absorbing paint described in any of (1) to (4) further including a colorant, (6) an ultraviolet absorbing film characterized by including an oxide of at least one transition metal selected from Ti, V, Cr, Mn, Fe, Co, Ni, Cu, Zn and Ce, (7) an ultraviolet absorbing film described in (6) further including a silicon oxide or an aluminum oxide, (8) an ultraviolet absorbing film described in (6) or (7) wherein the oxide of the transition metal is present in 20-100 mass %, (9) an ultraviolet absorbing film described in any of (6) to (8) wherein a film thickness is 50 µm or less,

(10) a light absorbing film characterized by including a stack of the ultraviolet absorbing film described in any of (6) to (9) and an absorbing film for absorbing at least visible light or infrared light,

(11) an optical element characterized by having the ultraviolet absorbing film described in any of (6) to (9) or the light absorbing film described in (10) on a surface,

(12) an optical unit characterized by having the optical element described in (11),

(13) a light illuminating apparatus characterized by having the optical unit described in (12).

Advantageous Effects

According to the present disclosure, there is provided an ultraviolet absorbing paint for forming a coating film that ensures the outstanding durability while markedly inhibiting the generation of stray light in the state of a thin film, as well as an ultraviolet absorbing film, a light absorbing film, an optical element, an optical unit and a light illuminating apparatus.

It is a simple diagram showing a structure example of an optical element according to the present disclosure.

Figure 2:
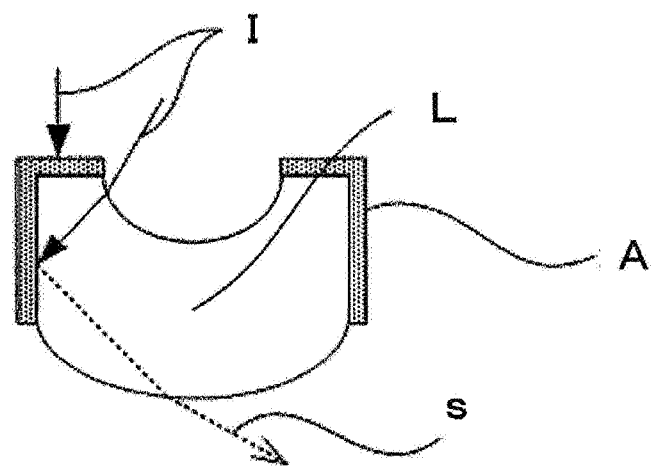

FIG. 2 is a simple diagram showing a structure example of an optical element according to the present disclosure.

Figure 3:
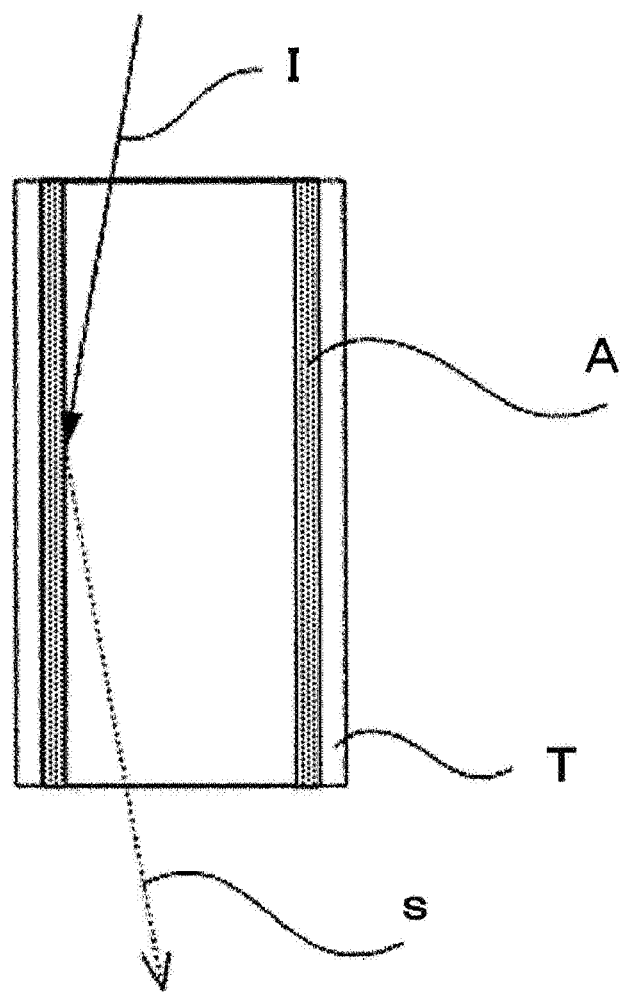

FIG. 3 is a simple diagram showing a structure example of an optical element according to the present disclosure.

Figure 4:
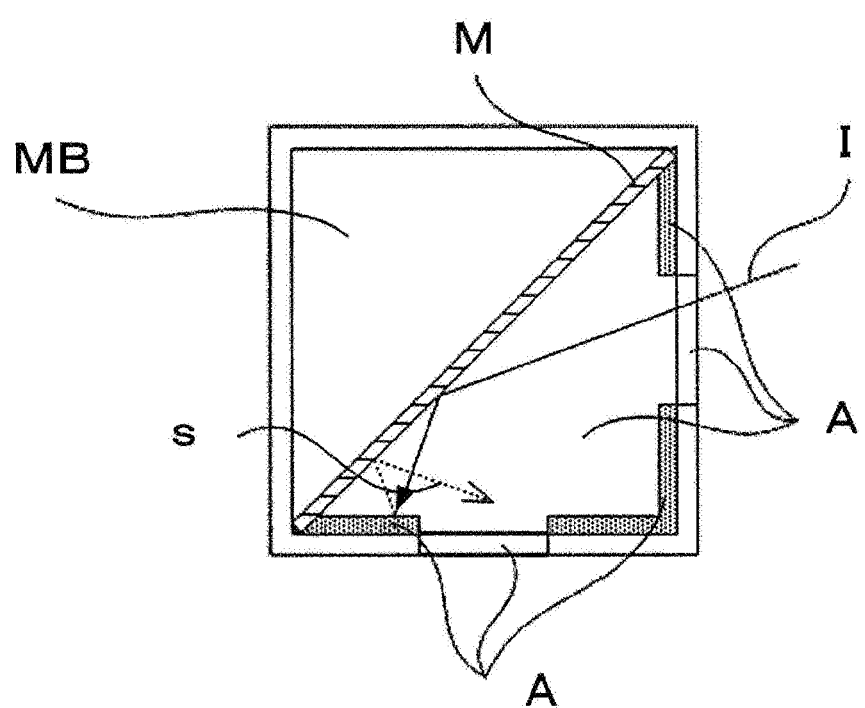

FIG. 4 is a simple diagram showing a structure example of an optical element according to the present disclosure.

Figure 5:
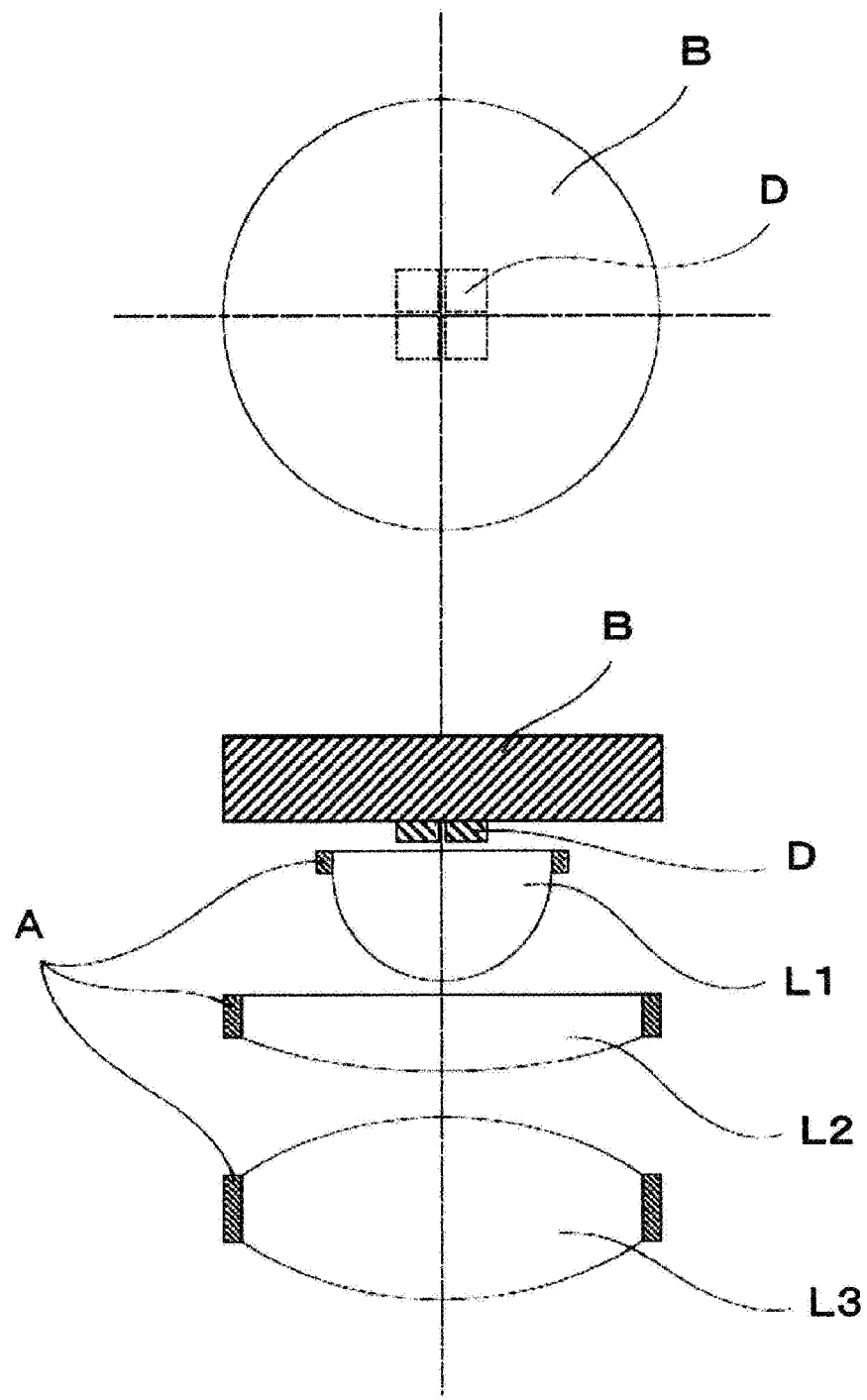

FIG. 5 is a simple diagram showing a structure example of an optical unit according to the present disclosure.

Figure 6:
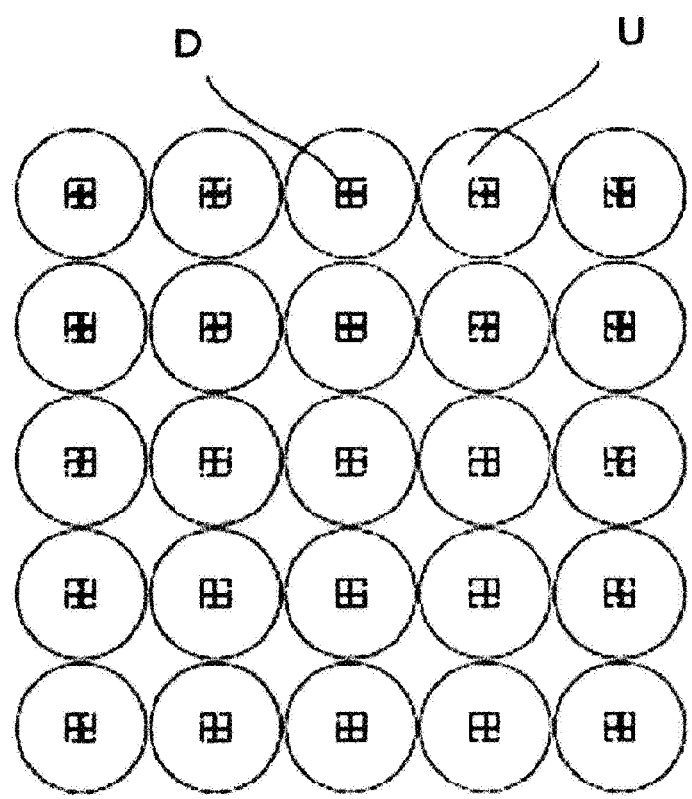

FIG. 6 is a simple diagram showing a structure example of a light illuminating apparatus according to the present disclosure.

Figure 7:
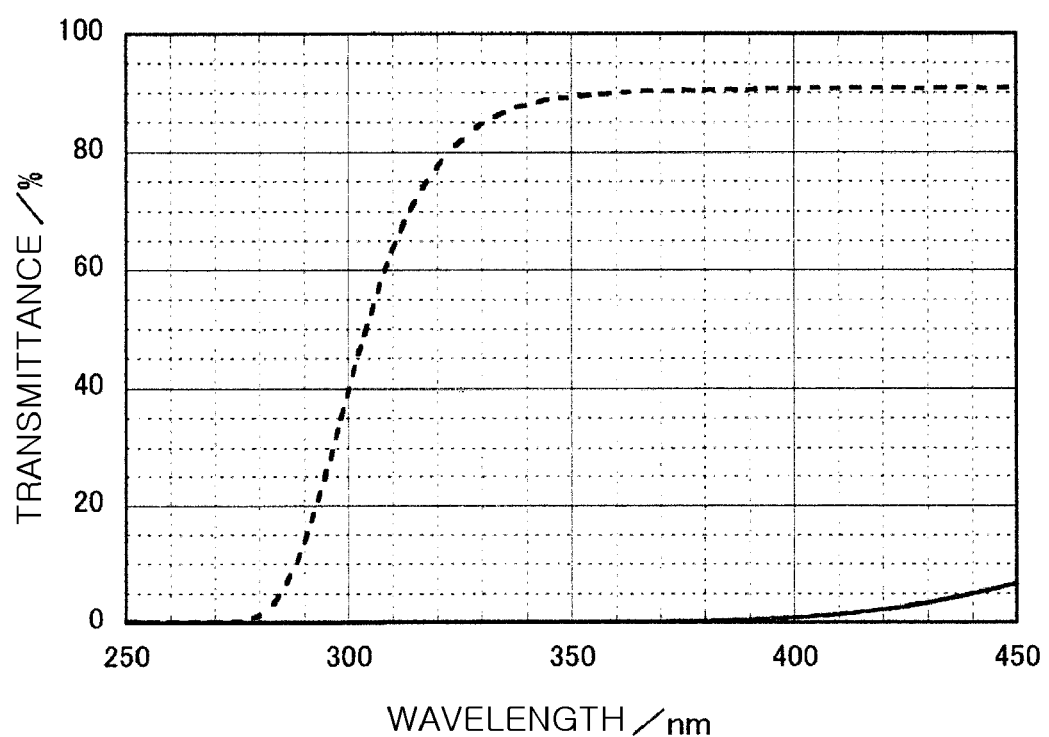

FIG. 7 is a diagram showing a transmittance curve of a $Fe_xO_y$ based ultraviolet absorbing film attached substrate obtained in Example 1.

Figure 8:
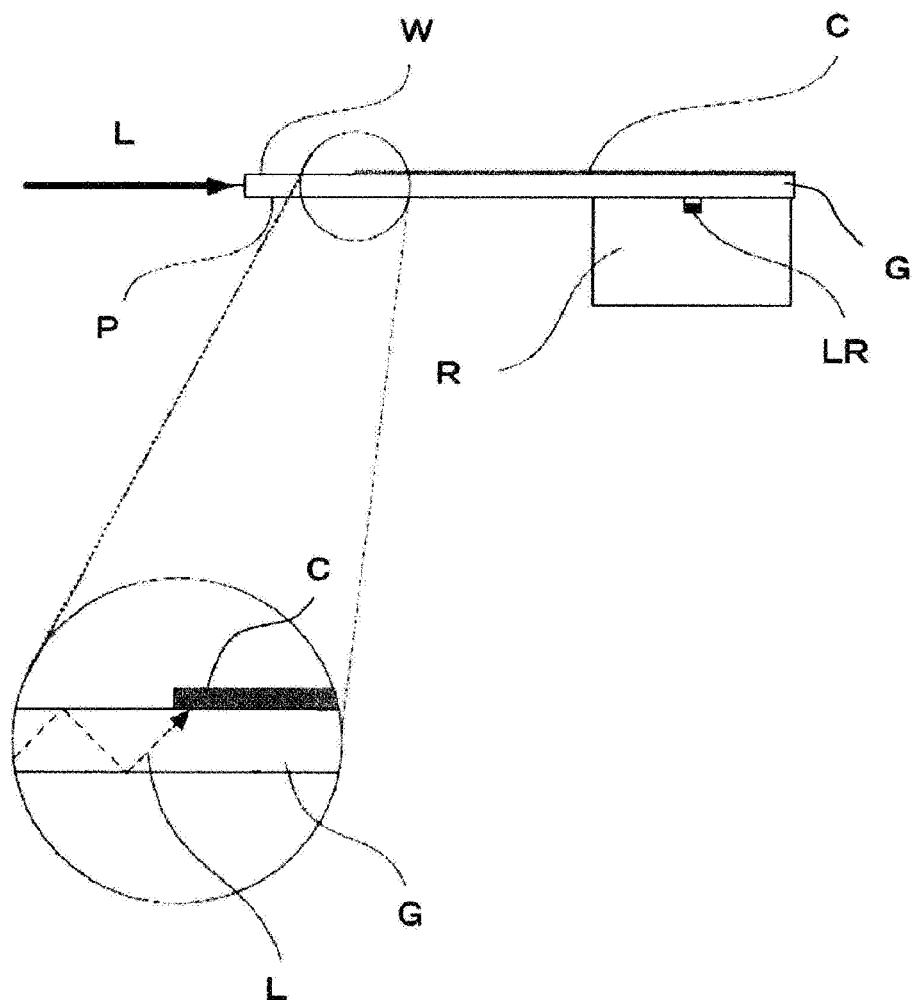

FIG. 8 is a simple diagram for explaining an assessment method of an ultraviolet light absorption effect.

Figure 9:
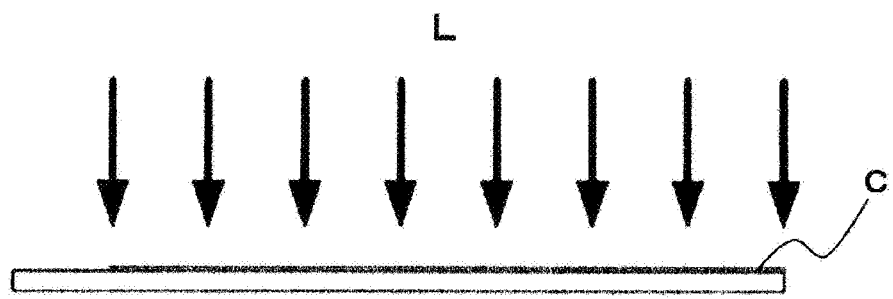

FIG. 9 is a simple diagram for explaining a durability assessment method of an ultraviolet absorbing film.

Figure 10:
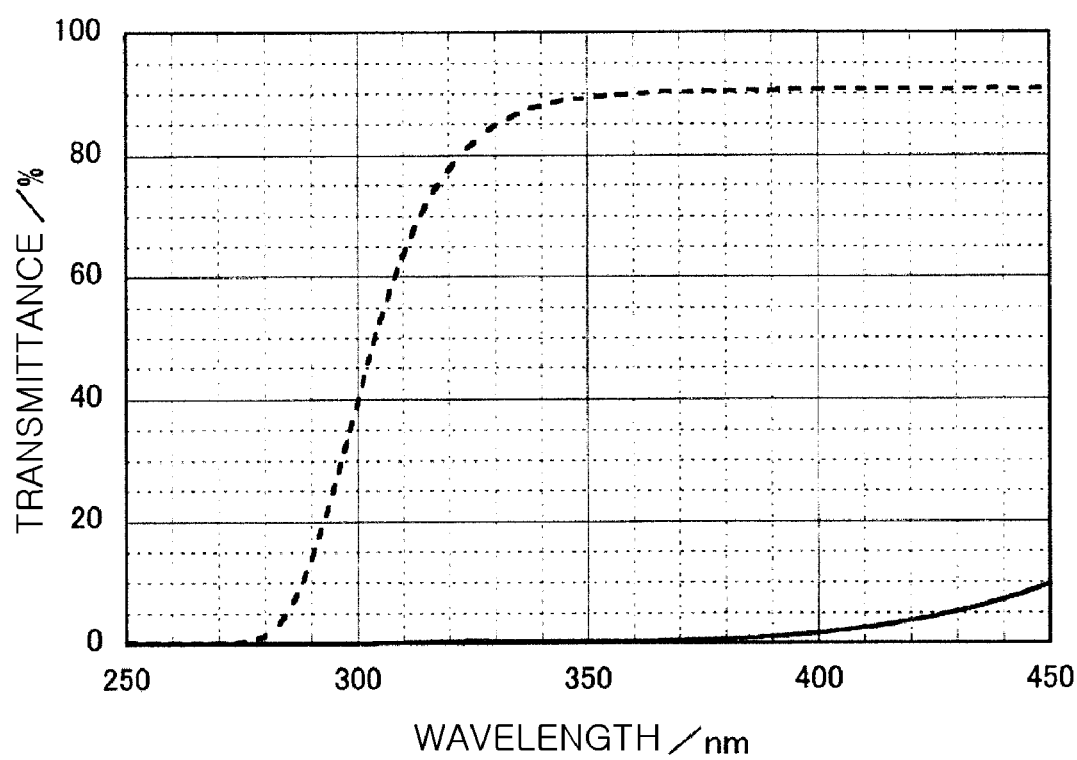

FIG. 10 is a diagram showing a transmittance curve of a chromium oxide ($Cr_xO_y$)—$SiO_2$ based ultraviolet absorbing film attached substrate obtained in Example 2.

Figure 11:
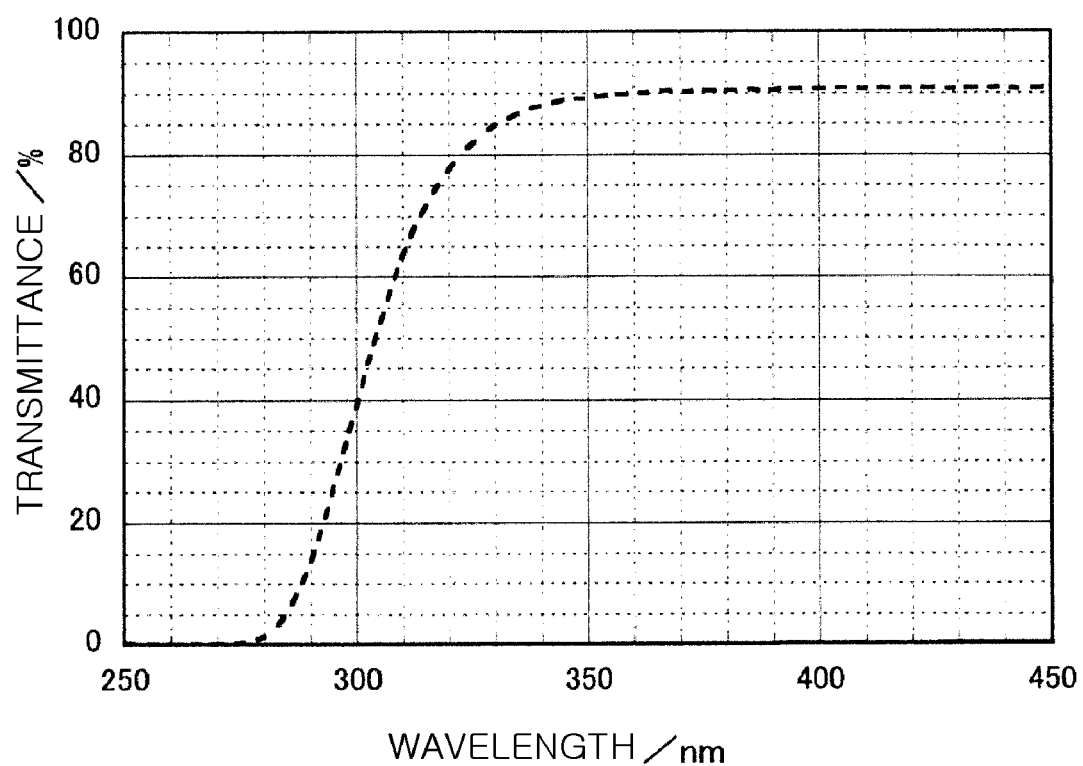

FIG. 11 is a diagram showing a transmittance curve of a manganese oxide ($Mn_xO_y$) based ultraviolet absorbing film attached substrate obtained in Example 3.

Figure 12:
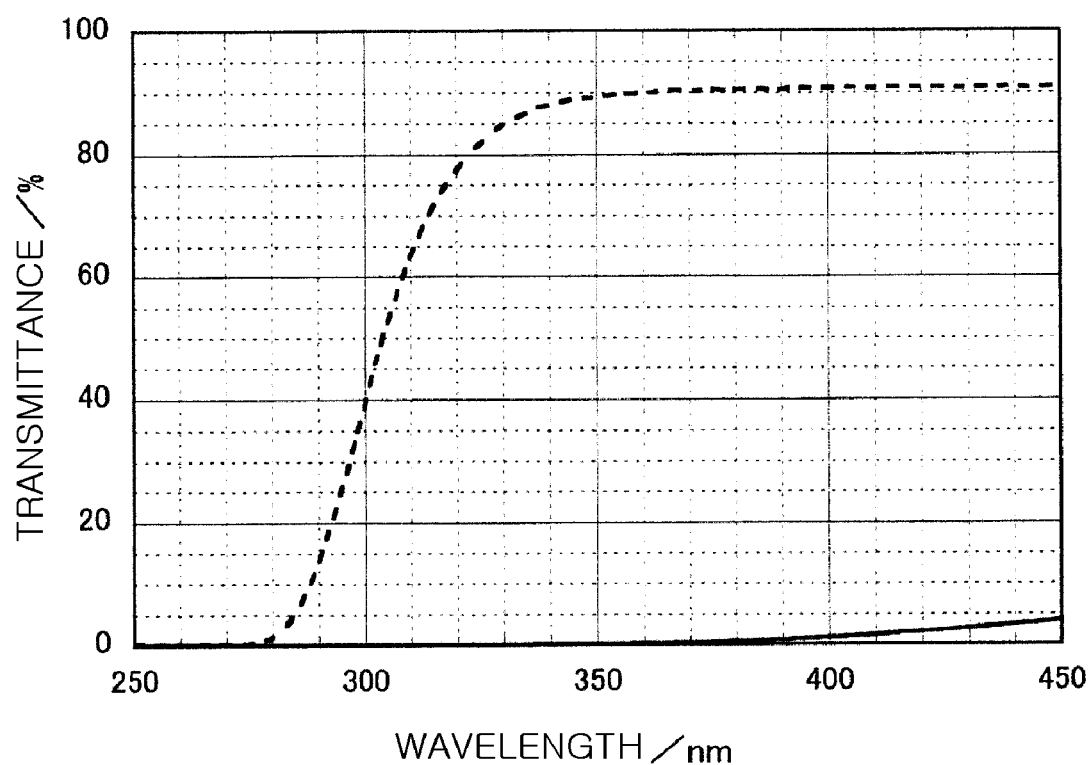

FIG. 12 is a diagram showing a transmittance curve of a manganese oxide ($Mn_xO_y$)—$SiO_2$ based ultraviolet absorbing film attached substrate obtained in Example 4.

Figure 13:
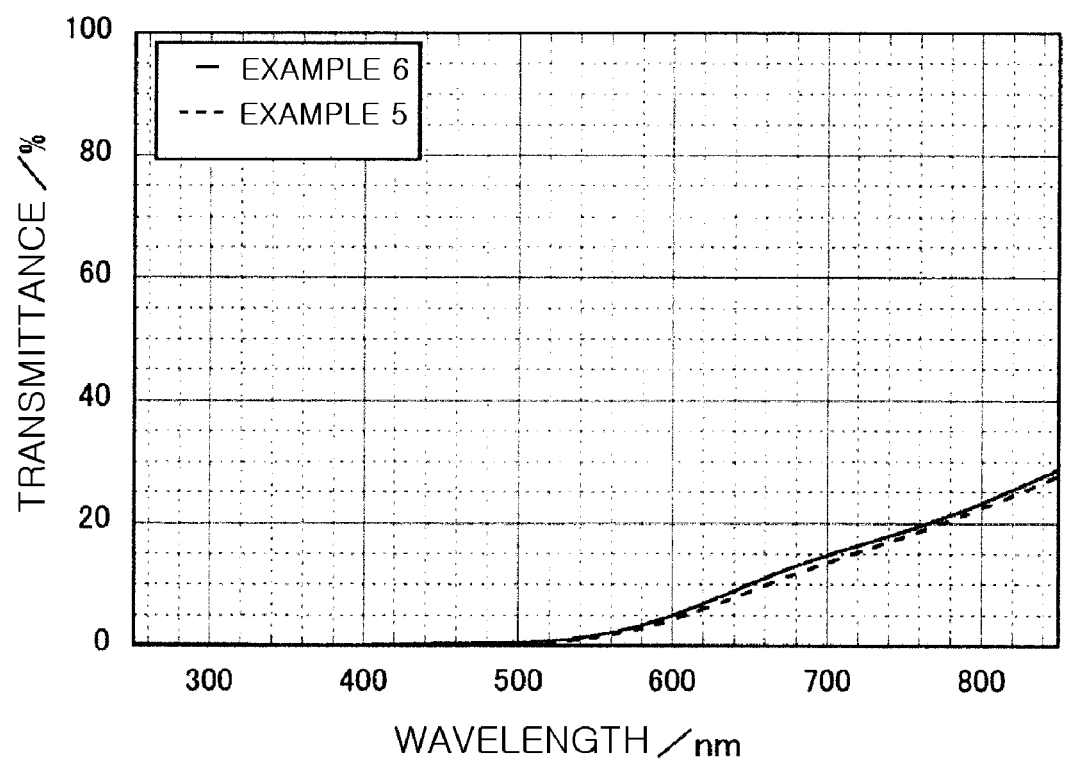

FIG. 13 is a diagram showing a transmittance curve of glass substrates after coating and drying of each of absorbing film forming coating solutions obtained in Examples 5 and 6.

Figure 14:
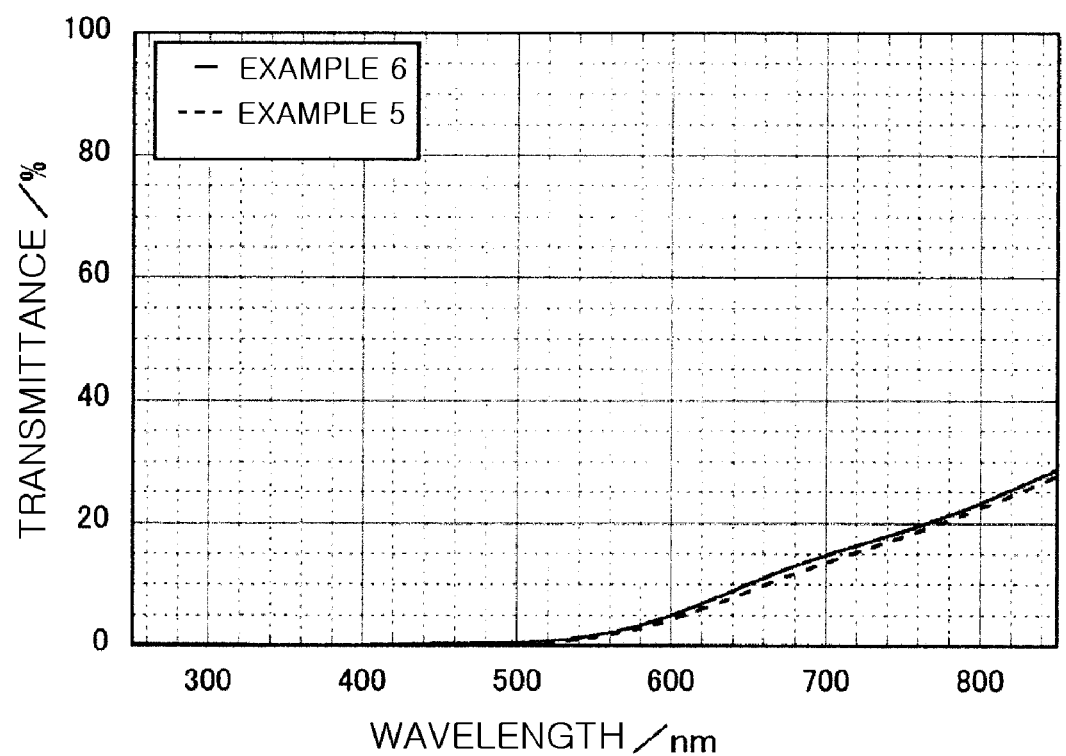

FIG. 14 is a diagram showing a transmittance curve of glass substrates after coating, drying, and heat treatment of each of absorbing film forming coating solutions obtained in Examples 5 and 6.

Figure 15:
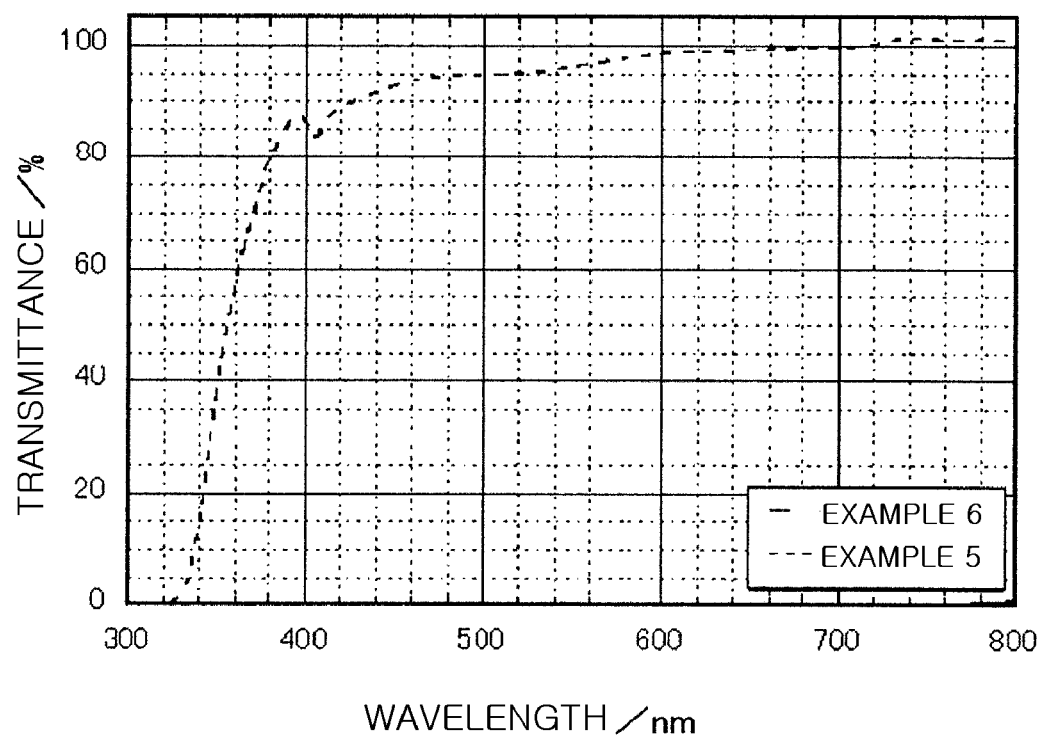

FIG. 15 is a diagram showing a transmittance curve of absorbing film forming coating solutions obtained in Examples 5 and 6.

Figure 16:
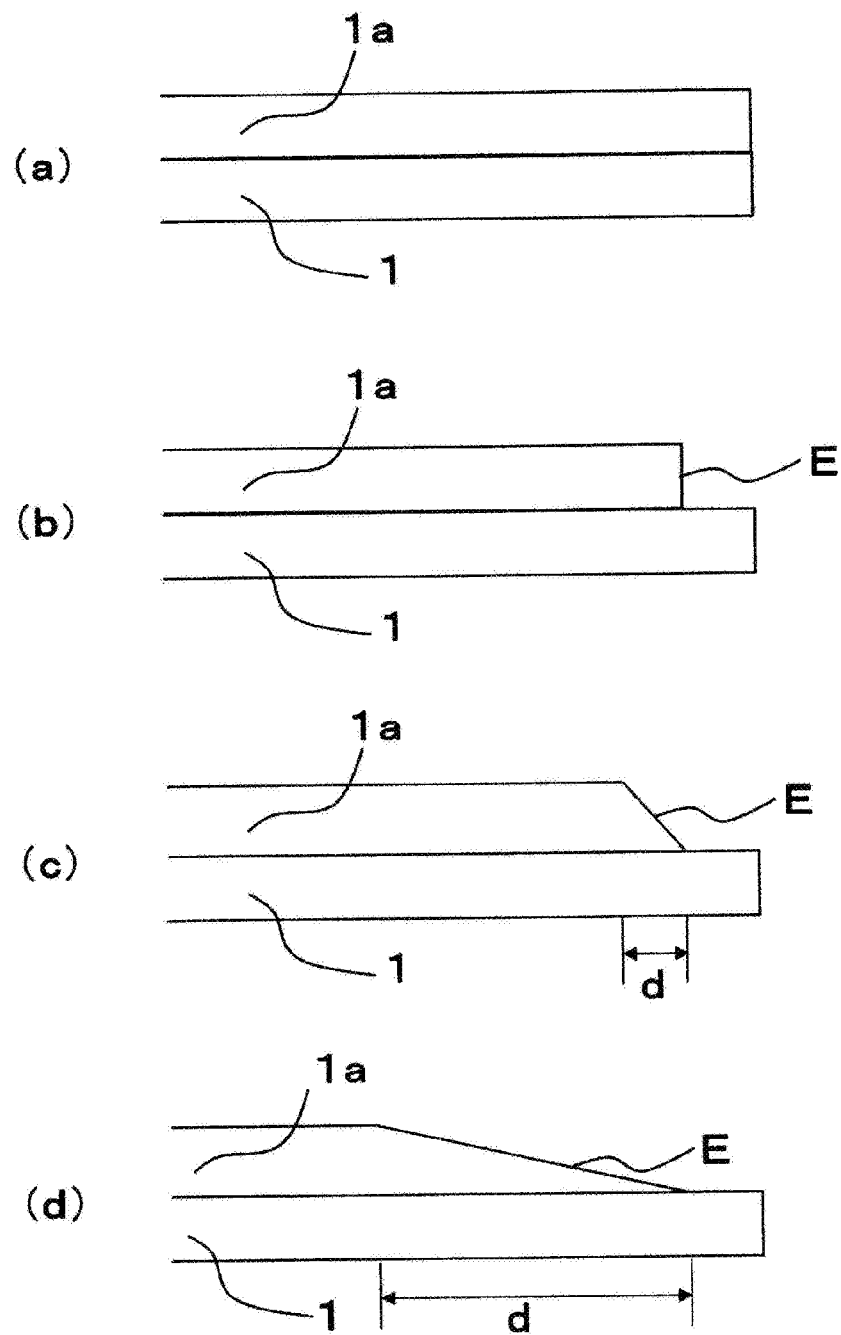

FIG. 16 is a simple diagram for explaining the shape of edge portions of silicon wafers obtained in Example 7 and Comparative Example 2.

BEST MODE

Mode for Carrying Out the Invention

First, an ultraviolet absorbing paint according to the present disclosure is described.

The ultraviolet absorbing paint according to the present disclosure is characterized by including an oxide precursor of at least one transition metal selected from Ti, V, Cr, Mn, Fe, Co, Ni, Cu, Zn and Ce.

Hereinafter, the ultraviolet light as used herein refers to light at 250-420 nm wavelength regions. Furthermore, the oxide precursor of the transition metal as stated herein forms an oxide of the corresponding transition metal by heating.

The ultraviolet absorbing paint according to the present disclosure includes an oxide precursor of at least one transition metal selected from Ti, V, Cr, Mn, Fe, Co, Ni, Cu, Zn and Ce as an oxide precursor of transition metal, and the transition metal is preferably at least one selected from Ti, Cr, Mn, Fe, Co, Ni, Cu and Zn, and more preferably, at least one selected from Ti, Cr, Mn, Fe, Cu and Zn.

The oxide precursor of the transition metal is preferably a metal salt, a metal acid salt, or an organic metal compound of the transition metal.

The metal salt of the transition metal is not limited to a particular type if it is heated to form an oxide of the transition metal and can be dissolved in the ultraviolet absorbing paint, and for example, includes at least one metal salt selected from nitrate, sulfate, acetate, chloride, phosphate, carbonate, and hydroxide.

The metal acid salt of the transition metal is not limited to a particular type if it is heated to form an oxide of the transition metal and can be dissolved in the ultraviolet absorbing paint, and for example, includes at least one selected from vanadate, chromate, dichromate, manganate, permanganate, ferrate, ferrite, cobaltate, nickelate, cuprate, zincate, and ceriumate.

The organic metal compound of the transition metal is not limited to a particular type if it is heated to form an oxide of the transition metal and can be dissolved in the ultraviolet absorbing paint, and includes at least one selected from metal alkoxide, metal alkoxide derivatives (for example, an organic metal compound in which some or all alkoxyl groups of metal alkoxide are substituted by ligands of acetyl acetone or ethyl acetoacetate), stearic acid soap, lauric acid soap, ricinoleic acid soap, octylic acid soap, naphthenic acid soap, montanic acid soap, behenic acid soap, sebacic acid soap, myristic acid soap, palmitic acid soap, and 12-hydroxystearic acid soap.

The oxide of at least one transition metal selected from Ti, V, Cr, Mn, Fe, Co, Ni, Cu, Zn and Ce exerts strong absorption on light at ultraviolet regions.

The ultraviolet absorbing paint according to the present disclosure is applied to a coating target such as an optical element and heated to form an ultraviolet absorbing film including a transition metal oxide on the surface of the coating target such as an optical element, so even in case that the ultraviolet absorbing paint is used to absorb ultraviolet light in an apparatus for outputting a high intensity of ultraviolet light with high optical energy, it can markedly inhibit the generation of stray light in the state of a thin film, and even in case that the ultraviolet absorbing paint includes organics such as a solvent, it can remove the organics by heat treatment to form a homogeneous transition metal oxide film, and the obtained ultraviolet absorbing film inhibits the discoloration, delamination, and loss of the coating film involved in deterioration of the organics and suitably ensures the outstanding durability, even though it is irradiated with ultraviolet light for a long time.

The ultraviolet absorbing paint according to the present disclosure may further include at least one selected from a silicon oxide precursor and an aluminum oxide precursor.

The silicon oxide precursor as stated herein forms silicon oxide by heating, and for example, includes tetraethoxysilane, tetramethoxysilane, methyltriethoxysilane, methyltrimethoxysilane, dimethyldiethoxysilane, dimethyldimethoxysilane, or oligomer or polysilazane thereof.

The aluminum oxide precursor as stated herein forms aluminum oxide by heating, and for example, includes at least one selected from aluminumalkoxide such as aluminum tri sec-butoxide and aluminum tri iso-propoxide, an aluminum chelate compound in which some or all alkoxyl groups of the aluminumalkoxide are modified by a chelating agent such as acetyl acetone and ethyl acetoacetate, aluminum soap such as aluminum stearate, aluminum octylate, and aluminum naphthenate, and an aluminum salt such as aluminum nitrate nonahydrate, aluminum chloride, and polyaluminum chloride.

As the ultraviolet absorbing paint according to the present disclosure further includes at least one adhesion promoter selected from a silicon oxide precursor and an aluminum oxide precursor. A complex film of the transition metal oxide and the silicon oxide or aluminum oxide is easily formed when forming an ultraviolet absorbing film, and by the complex film, and the adhesion of an ultraviolet absorbing film obtained by applying the ultraviolet absorbing paint to an optical element is improved, and the ultraviolet absorbing film is less susceptible to delamination.

The ultraviolet absorbing paint according to the present disclosure may include a colorant.

In case that the ultraviolet absorbing paint according to the present disclosure includes a colorant, the colorant does not cause gelation or deposition of absorbing film raw materials, is stably dissolved or dispersed in the paint, and has a light absorbing capability for visible light, and the transition metal precursor included in the ultraviolet absorbing paint preferably disappears by decomposition and volatilization or forms an inorganic oxide under the temperature at which metal oxide is formed.

The colorant includes colors of a dye or a pigment, and a dye is preferred. A dye is suitable as the colorant because it is dissolved well in the paint and less susceptible to agglomerate.

In case that the colorant is a dye, the dye is not limited to a particular type if it is dissolved in the ultraviolet absorbing paint and can make a coating film visible, and for example, includes at least one selected from methylene blue, triphenylmethane color (for example, malachite green), azoic dye, azo dye, acridine, aniline dye (for example, aniline black), indanthrene, eosin, congo red, dihydroindole, phenazine derivative color (for example, neutral red), phenolphthalein, fuchsine, fluorescein, para red, mauve, caramel color, gardenia color, anthocyanin color, annatto color, paprika color, carthamus color, monascus color, flavonoid color, cochineal color, amaranth (red #2), erythrosine (red #3), allura red AC (red #40), new coccine (red #102), phloxine (red #104), rose bengal (red #105), acid red (red #106), tartrazine (yellow #4), sunset yellow FCF (yellow #5), fast green FCF (green #3), brilliant blue FCF (blue #1) and indigo carmine (blue #2).

In case that the colorant is a pigment, the pigment is not limited to a particular type if it is less susceptible to agglomerate, and for example, includes at least one selected from bengala, ultramarine blue, prussian blue, carbon black, isoindolinone, isoindoline, azomethine, anthraquinone, anthrone, xanthene, diketopyrrolopyrrole, perylene, perinone, quinacridone, indigoid, dioxazine and phthalocyanine.

Although an ultraviolet absorbing film obtained from the ultraviolet absorbing paint according to the present disclosure can markedly inhibit the generation of stray light in the state of a thin film, in case that an ultraviolet absorbing film to obtain is thin, a coating film formed by applying the ultraviolet absorbing paint is thin, making it difficult to see whether or not it was applied to a desired place, it was applied in a required amount, or it was attached to an un-coating surface such as an incident surface or an exit surface of the lens. In case that the ultraviolet absorbing paint is transparent, it is more difficult to make a coating film visible, and in some instance, the ultraviolet absorbing paint is pre-colored according to the transition metal oxide precursor used, but if the extent of coloring is low or the thickness of the coating film is small, it is also difficult to make a coating film visible. Before forming an ultraviolet absorbing film by drying and thermal treatment of the coating film, a wrongly applied coating film may be cleaned out, but in case that heat treatment is performed as it stands, the coating film remains fixed on the surface of an optical element, making it difficult to remove, resulting in reduced yield of products.

In case that the ultraviolet absorbing paint according to the present disclosure further includes a colorant, it is possible to easily see whether or not there is a coating film when applying the ultraviolet absorbing paint, thereby easily improving the production efficiency of an optical element or the yield of products.

In case that the ultraviolet absorbing paint according to the present disclosure includes a colorant, a content ratio of the colorant is preferably 0.005-20 mass % in relation to the ultraviolet absorbing paint, more preferably 0.01-10 mass %, and even more preferably 0.05-5 mass %, by external division.

The ultraviolet absorbing paint according to the present disclosure may include a binder component or a solvent.

In case that the ultraviolet absorbing paint according to the present disclosure includes a binder component or a solvent, the binder component or the solvent preferably disappears by decomposition and volatilization under the temperature at which the transition metal precursor included in the ultraviolet absorbing paint forms a metal oxide.

The binder component includes at least one selected from polyvinylpyrrolidone, polyethyleneglycol, polyvinylalcohol, hydroxyethylcellulose, hydroxypropylcellulose, polyvinylacetate, and chitosan.

As the ultraviolet absorbing paint according to the present disclosure includes the binder component, an ultraviolet absorbing film can be easily formed by applying the oxide precursor of the transition metal to a substrate stably and homogeneously.

The binder may be properly selected according to the type of the transition metal precursor included in the ultraviolet absorbing paint, and for example, in case that the ultraviolet absorbing paint includes a precursor of manganese oxide as the transition metal precursor, it is preferred to include polyvinylpyrrolidone as the binder, and as polyvinylpyrrolidone is included as the binder, it is possible to suitably dissolve the precursor of manganese oxide in the ultraviolet absorbing paint.

Furthermore, the solvent preferably disappears by decomposition and volatilization under the temperature at which the transition metal precursor included in the ultraviolet absorbing paint forms a metal oxide.

The solvent includes at least one selected from methanol, ethanol, normal propanol, isopropanol, butanols such as normal butanol, 2-methoxyethanol, 2-ethoxyethanol, ethyleneglycol, diethyleneglycol, methyl acetate, ethyl acetate, propyl acetate, butyl acetate, propionic acid, and butyric acid.

In the ultraviolet absorbing paint according to the present disclosure, a content ratio of the oxide precursor of the transition metal is preferably 0.1-20.0 mass %, more preferably 0.5-15.0 mass %, and still more preferably 1.0-10.0 mass %, in oxide conversion of each transition metal.

As the content ratio of the transition metal oxide precursor is within the range, the ultraviolet absorbing paint according to the present disclosure can suitably inhibit the cracking or delamination when forming an ultraviolet absorbing film.

Generally, in case that an inorganic oxide film is formed on a substrate using the precursor of metal oxide, a substrate side surface of the inorganic oxide film formed connects to the substrate, making it easy to inhibit the contraction, while an outer surface side of the inorganic oxide film freely shrinks which involves great volume contraction, and as the metal oxide film is less flexible compared to a film of organic matter, the oxide film is susceptible to cracking or delamination due to stress occurred by the volume contraction.

In case that the content ratio of the transition metal oxide precursor is less than 0.1 mass %, the film thickness of the transition metal oxide film obtained is small, making it difficult to obtain a desired absorption feature, and in case that the content ratio of the transition metal oxide precursor exceeds 20.0 mass %, the film thickness of the transition metal oxide film obtained is large, leading to intensified stress, and as a consequence, cracking or delamination.

Furthermore, in calculating the content ratio of the transition metal, the oxide of the transition metal as stated herein represents $TiO_2$ in case that the transition metal is Ti, $V_2O_5$ in case that the transition metal is V, $Cr_2O_3$ in case that the transition metal is Cr, $Mn_2O_3$ in case that the transition metal is Mn, $Fe_2O_3$ in case that the transition metal is Fe, CoO in case that the transition metal is Co, NiO in case that the transition metal is Ni, CuO in case that the transition metal is Cu, ZnO in case that the transition metal is Zn, and $CeO_2$ in case that the transition metal is Ce.

In the ultraviolet absorbing paint according to the present disclosure, as the content ratio of the transition metal is within the range, it is possible to suitably dissolve the transition metal and form an ultraviolet absorbing film of a desired thickness in a simple and convenient manner.

In case that the ultraviolet absorbing paint according to the present disclosure further includes at least one selected from a silicon oxide precursor and an aluminum oxide precursor, in their oxide conversion, the total content ratio with the oxide precursor of the oxide converted transition metal is preferably 1.0-30.0 mass %, more preferably 2.0-25.0 mass %, and still more preferably 3.0-20.0 mass %.

In the ultraviolet absorbing paint according to the present disclosure, as the total content ratio of at least one selected from a silicon oxide precursor and an aluminum oxide precursor is within the range, the adhesion of an ultraviolet absorbing film obtained to a substrate can be improved, thereby easily inhibiting the cracking or delamination.

Furthermore, in calculating the content ratio, an oxide of the silicon oxide precursor as used herein represents $SiO_2$, and in calculating the content ratio, an oxide of the aluminum oxide precursor represents $Al_2O_3$.

The ultraviolet absorbing paint according to the present disclosure may be easily produced, for example, by dissolving an oxide precursor of transition metal, and if necessary, at least one selected from a silicon oxide precursor and an aluminum oxide precursor in a desired amount under the presence of a binder or a solvent.

According to the present disclosure, there is provided an ultraviolet absorbing paint for forming a coating film that ensures the outstanding durability while markedly inhibiting the generation of stray light in the state of a thin film.

An ultraviolet absorbing film according to the present disclosure is described below.

The ultraviolet absorbing film according to the present disclosure is characterized by including an oxide of at least one transition metal selected from Ti, V, Cr, Mn, Fe, Co, Ni, Cu, Zn and Ce.

The transition metal is preferably at least one selected from Ti, Cr, Mn, Fe, Co, Ni, Cu and Zn, and more preferably at least one selected from Ti, Cr, Mn, Fe, Cu and Zn.

Because the transition metal generally has plural atomic numbers, an oxide of the transition metal can assume a plural form, but the oxide of transition metal herein includes an oxide of a particular transition metal as well as a mixture of plural oxides.

Furthermore, the ultraviolet absorbing film according to the present disclosure may include a mixture of oxides of at least two transition metals.

An oxide of at least one transition metal selected from Ti, V, Cr, Mn, Fe, Co, Ni, Cu, Zn and Ce exerts strong absorption on light at ultraviolet regions.

Because the ultraviolet absorbing film according to the present disclosure includes the oxide of the transition metal, even in case that the ultraviolet absorbing paint is used to absorb ultraviolet light in an apparatus for outputting a high intensity of ultraviolet light with high optical energy, it can markedly inhibit the generation of stray light in the state of a thin film, and even though ultraviolet light is irradiated for a long time, it can inhibit the discoloration, delamination, and loss of the coating film, and suitably ensures the outstanding durability.

Furthermore, the ultraviolet absorbing film of the present disclosure may further include at least one selected from silicon oxide and aluminum oxide, together with the oxide of the transition metal.

As the ultraviolet absorbing film according to the present disclosure further includes at least one selected from silicon oxide and aluminum oxide, a complex film of the transition metal oxide and the silicon oxide or aluminum oxide is formed, and by the complex film, the adhesion to a substrate can be improved, thereby easily inhibiting the cracking or delamination.

The ultraviolet absorbing film of the present disclosure preferably includes the oxide of the transition metal in 20-100 mass %, more preferably 30-100 mass %, and even more preferably 35-100 mass %.

The ultraviolet absorbing film according to the present disclosure has a film thickness of 50 µm or less, more preferably 25 µm or less, still more preferably 10 µm or less, and even more preferably 5 µm or less.

Although the ultraviolet absorbing film according to the present disclosure can sufficiently absorb ultraviolet light even though it is a thin film, in achieving the object of the present disclosure, the film thickness of the ultraviolet absorbing film preferably is 0.01 µm or more, more preferably 0.02 µm or more, still more preferably 0.05 µm or more, and even more preferably 0.10 µm or more.

In case that the ultraviolet absorbing film according to the present disclosure is installed on the surface of an optical element, in particular, an optical element for LED, because a majority of optical elements for LED are very small in shape, a processing tolerance of the optical element is generally ±100 µm, to be strict, ±50 µm. To accurately center the optical element, the ultraviolet absorbing film is required to have a thin film shape, and in case that a plurality of optical elements is arranged, the ultraviolet absorbing film is also required to have a thin film shape to inhibit the misalignment of the respective optical elements, but generally, in case of thin film shape, the ultraviolet absorbing capacity of the ultraviolet absorbing film reduces.

Because the ultraviolet absorbing film according to the present disclosure includes an oxide of a particular transition metal, even in case that the ultraviolet absorbing film is used to absorb ultraviolet light in an apparatus for outputting a high intensity of ultraviolet light with high optical energy, it can markedly inhibit the generation of stray light even though it is in the shape of a thin film.

Furthermore, the film thickness of the ultraviolet absorbing film as used herein refers to a value obtained from a difference between the total thickness of the substrate and the ultraviolet absorbing film and the thickness of the substrate as measured using a micrometer (Mitutoyo MDH-25M).

In the ultraviolet absorbing film according to the present disclosure, the ultraviolet absorbing film preferably has an optical density (OD) of 1 or more, more preferably 2 or more, and even more preferably 3 or more.

When the optical density (OD) is within the range, even in case that the ultraviolet absorbing film is used to absorb ultraviolet light in an apparatus for outputting a high intensity of ultraviolet light with high optical energy, it can markedly inhibit the generation of stray light even though it is in the shape of a thin film.

Furthermore, the optical density (OD) as used herein refers to a value measured using an ultraviolet visible near-infrared spectrometer (Hitachi Seisakusho U-4100) when irradiated with irradiated light including light at a target wavelength or wavelength regions to absorb.

For the ultraviolet absorbing film according to the present disclosure, the one with no crack (fissure) when observed with a naked eye is suitable.

As the ultraviolet absorbing film according to the present disclosure has no crack (fissure), it is easy to inhibit the ultraviolet absorbing film from being delaminated from a coating target such as an optical element or forming dusts, thereby easily obtaining a desired stray light absorption effect.

The ultraviolet absorbing film according to the present disclosure can be suitably installed on the surface of an area other than an original optical path in an optical element-optical component such as a lens, a prism, and a body tube, and for example, the surface of an area other than the incident surface/exit surface of an optical element such as a circumferential edge of a lens or an inner surface of a body tube.

As the ultraviolet absorbing film according to the present disclosure is suitably installed on the surface of an area other than an original optical path as described above, even in case that the ultraviolet absorbing film is used to absorb ultraviolet light in an apparatus for outputting a high intensity of ultraviolet light with high optical energy, it can markedly inhibit the generation of stray light even though it is in the shape of a thin film.

The ultraviolet absorbing film according to the present disclosure may be produced more suitably for the ultraviolet absorbing paint according to the present disclosure.

A method for producing the ultraviolet absorbing film according to the present disclosure may include, for example, applying the ultraviolet absorbing paint according to the present disclosure to a substrate (where the absorbing film is to be formed), and forming a film by a sol-gel method.

The method for producing an ultraviolet absorbing film includes, for example, a method which applies the ultraviolet absorbing paint according to the present disclosure onto a coating target using a brush or a spray or by a dipping method or a spin coating method to form a coating film with a desired thickness, and performs proper drying treatment and heat treatment.

The temperature of the heat treatment is preferably 300-1000° C., and the treatment time of the heat treatment is preferably 1 minute-12 hours.

By this method, an intended metal oxide film (ultraviolet absorbing film) can be formed.

Even in case that the ultraviolet absorbing film according to the present disclosure is used to absorb ultraviolet light in an apparatus for outputting a high intensity of ultraviolet light with high optical energy, it can markedly inhibit the generation of stray light even though it is in the shape of a thin film.

A light absorbing film according to the present disclosure is described below.

The light absorbing film according to the present disclosure is characterized by including a stack of the ultraviolet absorbing film according to the present disclosure and an absorbing film for absorbing at least visible light or infrared light.

A detailed description of the ultraviolet absorbing film according to the present disclosure is the same as above.

In the light absorbing film according to the present disclosure, the absorbing film for absorbing visible light or infrared light may be installed by applying a known coating agent for forming the absorbing film for absorbing visible light or infrared light onto the ultraviolet absorbing film according to the present disclosure.

The coating agent includes, for example, at least one selected from a surface reflection preventive paint (Canon Kasei, Model No. CS-37) and a near infrared light shielding material (Sumitomo Kinzoku Kozan, Model No. YMF-02A).

The light absorbing film according to the present disclosure may be placed such that the ultraviolet absorbing film is disposed on the side where light enters, and such that the absorbing film for absorbing visible light or infrared light is disposed on the side where light enters.

As the light absorbing film according to the present disclosure has the absorbing film for absorbing at least one of visible light and infrared light on the ultraviolet absorbing film according to the present disclosure for absorbing ultraviolet light, the light absorbing film can markedly inhibit the generation of stray light even in case that it is applied to a light emitter which irradiates not only ultraviolet light with high optical energy but also light including visible light or infrared light.

The light emitter which irradiates not only ultraviolet light with high optical energy but also light including visible light or infrared light includes a lamp such as a mercury xenon lamp, a xenon lamp and a metal halide lamp, or a light emitting device such as a LED unit in which an ultraviolet LED (UV-LED), a white LED and a multi-wavelength LED is combined with a substrate.

An optical element according to the present disclosure is described below.

The optical element according to the present disclosure is characterized by having the ultraviolet absorbing film or the light absorbing film according to the present disclosure on the surface.

A detailed description of the ultraviolet absorbing film or the light absorbing film according to the present disclosure is the same as above. Furthermore, in the optical element according to the present disclosure, a detailed description of the location at which the ultraviolet absorbing film is formed or the method for forming the ultraviolet absorbing film is the same as above.

The optical element according to the present disclosure generally includes at least one selected from those generally called an optical element or an optical component such as a lens, a prism, a body tube, and a mirror.

Hereinafter, the optical element according to the present disclosure is detailed through specific examples.

Figure 1:
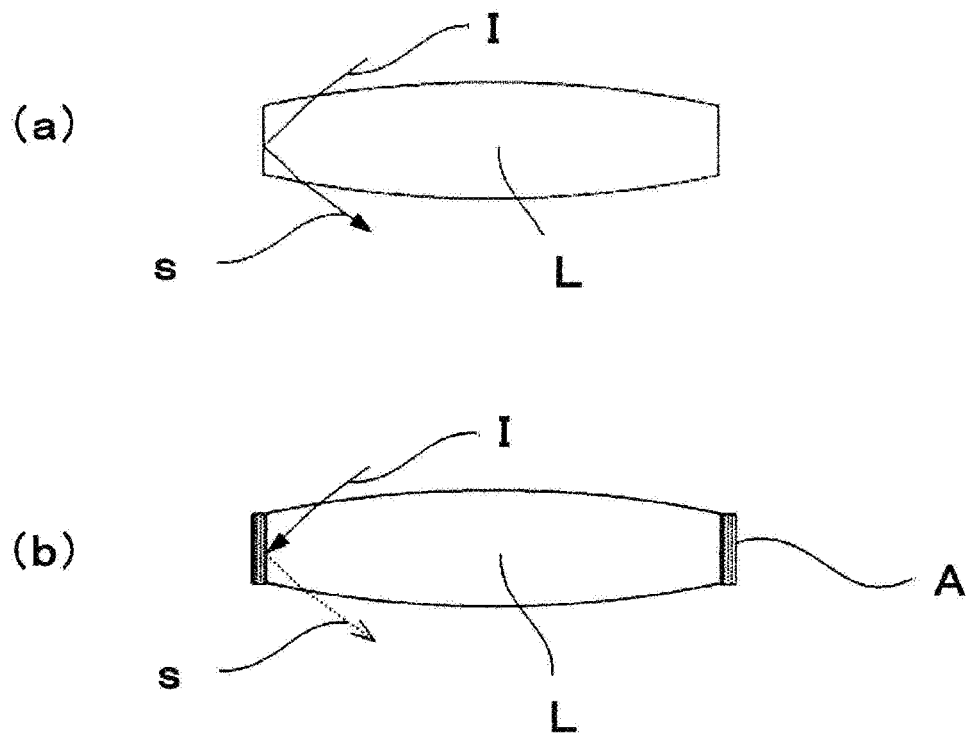
FIG. 1 is a simple diagram showing a structure example of an optical element according to a related art (FIG. 1(A)) and a structure example of an optical element according to the present disclosure (FIG. 1(B)).

FIG. 1 is a simple diagram showing a cross section of a conventional optical element (a double convex lens) L as an example of the optical element according to the present disclosure (FIG. 1(A)), and a cross section of the optical element (a double convex lens) L according to the present disclosure (FIG. 1(B)), and generally, the double convex lens generates stray light S when a portion of ultraviolet light I incident on an optical surface enters from a circumferential edge (side surface) of the lens or is reflected on the inner wall surface of the circumferential edge of the lens as shown in FIG. 1(A), while the optical element according to the present disclosure has an ultraviolet absorbing film A on the circumferential edge of the double convex lens L as shown in FIG. 1(B), thereby effectively absorbing ultraviolet light on the circumferential edge of the lens and inhibiting the generation of stray light S (In FIG. 1(B), stray light S generated in case that the double convex lens L does not have the ultraviolet absorbing film A is indicated by a dotted line for convenience).

Although FIG. 1 shows a double convex lens as the lens L, the lens L may be any of a double concave lens, a piano-convex lens, and a plano-concave lens instead of the double convex lens, and in this case, the ultraviolet absorbing film A is installed on the circumferential edge of each lens.

FIG. 2 is a simple diagram showing a cross section of a meniscus lens as an example of the optical element according to the present disclosure, and generally, the meniscus lens generates stray light S when a portion of ultraviolet light I incident on the optical surface enters from the circumferential edge (side surface) of the lens or is reflected on the inner wall surface of the circumferential edge of the lens as shown in FIG. 2, while the optical element according to the present disclosure has the ultraviolet absorbing film A on the circumferential edge of the lens L, thereby effectively absorbing ultraviolet light on the circumferential edge of the lens and inhibiting the generation of stray light (In FIG. 2, stray light S generated in case that the meniscus lens L does not have the ultraviolet absorbing film A is indicated by a dotted line for convenience).

Furthermore, the meniscus lens as shown in FIG. 2 generally has a light shielding mask installed on a flat surface part of the incident surface to allow light to selectively enter from a concave part of the incident surface, but in case that such a mask is absent, likewise, stray light S is generated by light incident from the flat surface part of the incident surface. For this reason, in the example shown in FIG. 2, the ultraviolet absorbing film A is also installed on the flat surface part of the incident surface so that ultraviolet light is effectively absorbed on the flat surface part of the incident surface side, to allow the ultraviolet absorbing film to serve as the mask while inhibiting the generation of stray light.

FIG. 3 is a simple diagram showing a cross section of a body tube as an example of the optical element according to the present disclosure, and generally, the body tube generates stray light S when a portion of ultraviolet light I incident on the body tube surface is reflected on the inner wall surface of the body tube as shown in FIG. 3, while the body tube shown in FIG. 3 has the ultraviolet absorbing film A on the inner wall surface of the body tube T, thereby effectively absorbing light on the inner wall surface and inhibiting the generation of stray light (In FIG. 3, stray light S generated in case that the body tube T does not have the ultraviolet absorbing film A is indicated by a dotted line for convenience).

Conventionally, a body tube underwent black alumite processing so that a black pigment was impregnated into pores formed by alumite treatment of the inner wall surface, but because the black pigment is an organic matter, when light at short wavelengths such as ultraviolet light or a high intensity of light was irradiated into the body tube, the pigment decomposed and was discolored, making it susceptible to generation of stray light. As opposed to this, because the optical element according to the present disclosure has the ultraviolet absorbing film of the present disclosure containing an oxide of transition metal, the optical element can inhibit the generation of stray light while ensuring the outstanding durability against a high intensity of ultraviolet light.

FIG. 4 is a simple diagram showing a cross section of a mirror box as an example of the optical element according to the present disclosure, and generally, the mirror box directs ultraviolet light from an entrance port of the mirror box to an exit port as shown in FIG. 4, but a portion of incident ultraviolet light I is reflected on the inner wall surface of the mirror box, generating stray light S. In contrast, the mirror box MB shown in FIG. 4 has the ultraviolet absorbing film A on the inner wall surface except a mirror area, or a circumferential edge of the entrance port or the exit port of the inner wall surface of the mirror box MB, thereby effectively absorbing ultraviolet light on the inner surface except the mirror surface and inhibiting the generation of stray light (In FIG. 4, stray light S generated in case that the mirror box MB does not have the ultraviolet absorbing film A is indicated by a dotted line for convenience).

Furthermore, although not shown, the optical element according to the present disclosure may have the ultraviolet absorbing film of the present disclosure installed on the surface except an incident surface, an exit surface, and a reflecting surface of a prism.

Even in case that the optical element according to the present disclosure is used to absorb ultraviolet light in an apparatus for outputting a high intensity of ultraviolet light with high optical energy, or is used to absorb ultraviolet light as well as visible light or infrared light, the optical element can markedly inhibit the generation of stray light even though it is in the shape of a thin film.

An optical unit according to the present disclosure is described below.

The optical unit according to the present disclosure is characterized by having the optical element according to the present disclosure.

A detailed description of the optical element according to the present disclosure is the same as above.

The optical unit according to the present disclosure is not limited to a particular type if it has the optical element according to the present disclosure.

The optical unit according to the present disclosure generally has a light source, together with the optical element.

The light source is not limited to a particular type if it can irradiate light including ultraviolet light, and includes, for example, at least one selected from an ultraviolet LED (UV-LED) and a discharge lamp such as a short arc lamp or a long arc lamp.

FIG. 5 illustrates the optical unit according to the present disclosure, and the upper diagram of FIG. 5 is a simple diagram when viewed from top, and the lower diagram of FIG. 5 is a simple diagram of the cross section when viewed from the side.

The optical unit shown in FIG. 5 includes 4 ultraviolet LEDs (LED dies) D installed on a substrate B, and a first lens L1, a second lens L2 and a third lens L3 installed from ultraviolet LED side (irradiation side) to exit side in a sequential order, and has the ultraviolet absorbing film according to the present disclosure on circumferential edges of the first lens L1, the second lens L2 and the third lens L3.

Even in case that the optical unit according to the present disclosure is used in an apparatus for outputting a high intensity of ultraviolet light with high optical energy or is used to absorb ultraviolet light as well as visible light or ultraviolet light, the optical unit can irradiate light while inhibiting the generation of stray light.

A light illuminating apparatus according to the present disclosure is described below.

The light illuminating apparatus according to the present disclosure is characterized by having the optical unit according to the present disclosure.

A detailed description of the optical unit according to the present disclosure is the same as above.

The light illuminating apparatus according to the present disclosure includes, for example, a spot ultraviolet light source, a linear ultraviolet light source, an area ultraviolet light source, a light-guide type ultraviolet light source, and a light source device for peripheral exposure.

The light illuminating apparatus according to the present disclosure includes at least one optical unit according to the present disclosure, and generally includes at least two optical units according to the present disclosure.

FIG. 6 is a top view showing the light illuminating apparatus according to the present disclosure, and in the example shown in FIG. 6, the light illuminating apparatus includes 25 optical units U shown in FIG. 5, and in use, the optical units may illuminate light to an object in cooperation.

Even though the light illuminating apparatus according to the present disclosure outputs a high intensity of ultraviolet light with high optical energy, or outputs ultraviolet light as well as visible light or infrared light, it can markedly inhibit the generation of stray light and markedly inhibit the stray light from getting mixed with the original irradiated light because it has the optical unit according to the present disclosure.

EXAMPLE

Hereinafter, the present disclosure is described in further detail by examples and comparative examples, but is not limited to the following examples.

Example 1

19.4 g of ethyleneglycol (rational formula: $C_2H_4(OH)_2$) and 12.6 g of iron (Ill) nitrate nonahydrate (rational formula: $Fe(NO_3)_3 9H_2O$) was fed into a container made of glass, and stirred using a magnetic stirrer under the room temperature for 2 hours, and after iron (Ill) nitrate nonahydrate was dissolved in ethyleneglycol, 68.0 g of isopropanol (rational formula: $CH_3CH(OH)CH_3$) was fed and stirred under the room temperature for another 2 hours, to prepare 100 g of a brown, transparent, and homogeneous absorbing film forming coating solution ($Fe_xO_y$ based ultraviolet absorbing paint).

Assume that oxide was fully produced from iron nitrate by thermal treatment of the obtained absorbing film forming coating solution, solids in the same coating solution were 2.5 mass % in $Fe_2O_3$ conversion.

The absorbing film forming coating solution was applied to both surfaces of a slide glass substrate (Matsunami Glass Kogyo, S1127, length 76 mm×width 26 mm×thickness 1.0-1.2 mm) by a dipping method at a pull rate of 30 cm/min. The obtained thin film was light orange, transparent, and homogeneous.

The thin film attached slide glass substrate was dried at 70° C. for 1 hour and put in a heat treatment furnace, and under the atmospheric environment, at the temperature increased from the room temperature to 500° C. at 200° C./hr and maintaining at 500° C. for 1 hour, an iron oxide ($Fe_xO_y$) based ultraviolet absorbing film was formed on the slide glass substrate. The thickness of the obtained ultraviolet absorbing film was less than 1 μm.

By the thermal treatment, the thin film was changed from light orange to dark orange, and the obtained ultraviolet absorbing film was homogeneous, and cracking or delamination was not found.

Transmittance curves of the obtained ultraviolet absorbing film attached substrate and a substrate with no ultraviolet absorbing film are shown in FIG. 7.

In FIG. 7, the dashed line is the transmittance curve of the substrate alone (with no ultraviolet absorbing film) and the solid line is the transmittance curve of the $Fe_xO_y$ based ultraviolet absorbing film attached substrate, and it can be seen that the transmittance of the solid line (with the ultraviolet absorbing film) is markedly inhibited over the entire ultraviolet light region compared to the dashed line (the substrate alone), because absorption by iron oxide that forms the ultraviolet absorbing film occurs at the ultraviolet light regions of 250-420 nm.

(Evaluation of Ultraviolet Light Absorption Effect)

After masking an optically polished surface of a quartz glass substrate (a primary surface of length 20 mm×width 50 mm×thickness 2 mm, length 20 mm×width 50 mm is an optically polished surface, and the other primary surface is #1000 sandpaper polished surface) using a masking tape, the absorbing film forming coating solution was applied to the sandpaper polished surface by a dipping method at a pull rate of 30 cm/min.

The masking tape was removed from the thin film attached quartz glass substrate, which was dried at 70° C. for 1 hour and put in a heat treatment furnace, and at the temperature increased from the room temperature to 500° C. at 200° C./hr and maintaining at 500° C. for 1 hour, an iron oxide ($Fe_xO_y$) based ultraviolet absorbing film was formed on the sandpaper polished surface of the quartz glass substrate. The film thickness of the obtained iron oxide ($Fe_xO_y$) based ultraviolet absorbing film was less than 1 μm.

Using the obtained ultraviolet absorbing film attached quartz glass substrate, as shown schematically in FIG. 8, the intensity of light incident from the side surface (edge surface) of the quartz glass substrate G was measured on the primary surface (the sandpaper polished surface W and the optically polished surface P) (the upper diagram of FIG. 8 is a simple diagram showing the whole metering system, and the lower diagram of FIG. 8 is a simple enlarged diagram of an area enclosed by a circle in the upper diagram).

That is, (1) A quartz glass substrate G (length 20 mm×width 50 mm×thickness 2 mm, a primary surface of length 20 mm×width 50 mm is an optically polished surface P, and the other primary surface is a #1000 sandpaper polished surface W) before formation of the ultraviolet absorbing film was placed on a light receiver R with a light receiving part LR in the arrangement shown in FIG. 8, and when illuminating ultraviolet light L to an edge portion side of the corresponding quartz glass substrate horizontally from the side, output of a UV-LED light source (peak wavelength 365 nm) was adjusted so that an indicated value of the light receiving part LR was 10.00 mW/cm², (2) Subsequently, as shown in FIG. 8, when the quartz glass substrate was changed to the quartz glass substrate G having a sandpaper polished surface W and an optically polished surface P as a primary surface (a primary surface of length 20 mm×width 50 mm×thickness 2 mm, length 20 mm×width 50 mm is an optically polished surface P, and the other primary surface is a #1000 sandpaper polished surface W) with the ultraviolet absorbing film C installed thereon, and likewise as above, ultraviolet light L was illuminated to the edge portion side of the quartz glass substrate horizontally, (3) In relation to the intensity $I_0$ of incident light, a ratio (($I_1/I_0$)×100) of the intensity $I_1$ of exit light that is internally reflected within the quartz glass substrate, is absorbed on the ultraviolet absorbing film C, and exits to the light receiving part LR side was measured.

As a result, the intensity $I_0$ of exit light exiting to the light receiver R side was 10.00 mW/cm² in case that the quartz glass substrate with no ultraviolet absorbing film was used, while the intensity $I_1$ of exit light exiting to the light receiver R side was 0.20 mW/cm² in case that the quartz glass substrate G having the ultraviolet absorbing film C was used, and a ratio (($I_1/I_0$)×100) of the intensity $I_1$ of exit light exiting to the light receiver R side to the intensity $I_0$ of incident light was 2.0%.

(Durability Evaluation)

On the same ultraviolet absorbing film attached quartz glass substrate as that used in the ⌈evaluation of ultraviolet light absorption effect⌋, light was incident from the sandpaper polished surface W side having the ultraviolet absorbing film C at the incidence angle of 90° with the intensity of 2000 mW/cm² for 5000 hours as shown in FIG. 9, but cracking or delamination did not occur in the ultraviolet absorbing film C, and transmittance did not change before and after ultraviolet light radiation.

Example 2

A mixed solution of 16.0 g of 0.7 mass % aqueous hydrochloric acid and 18.9 g of isopropanol was slowly added to a mixed solution of 23.6 g of tetraethoxysilane (rational formula: $Si(C_2H_{5O})_4$) and 18.9 g of isopropanol and stirred for 2 hours, and 22.6 g of chromium (III) nitrate nonahydrate (rational formula: $Cr(NO_3)_3.9H_2O$) was added and stirred for another 2 hours, to prepare 100 g of a blue, transparent, and homogeneous absorbing film forming coating solution (chromium oxide-$SiO_2$ based ($Cr_xO_y$—$SiO_2$ based) ultraviolet absorbing paint).

Assume that $Cr_2O_3$ was fully produced from chromium (III) nitrate and $SiO_2$ was fully produced from tetraethoxysilane by thermal treatment of the obtained absorbing film forming coating solution, solids in the same coating solution contained 20 mol % $Cr_2O_3$ and 80 mol % $SiO_2$, and the solids in the coating solution (assuming that oxide was fully produced by thermal treatment) were 11.1 mass % in $20Cr_2O_3.80SiO_2$ conversion.

The absorbing film forming coating solution was applied to both surfaces of a slide glass substrate (Matsunami Glass Kogyo, S1127, length 76 mm×width 26 mm×thickness 1.0-1.2 mm) by a dipping method at a pull rate of 30 cm/min. The obtained thin film was light blue, transparent, and homogeneous.

The thin film attached slide glass substrate was dried under the same condition as Example 1, i.e., at 70° C. for 1 hour, and put in a heat treatment furnace, and under the atmospheric environment, at the temperature increased from the room temperature to 500° C. at 200° C./hr and maintaining at 500° C. for 1 hour, a chromium oxide-SiO2 based ($Cr_xO_y$—SiO2 based) ultraviolet absorbing film was formed on the slide glass substrate. The thickness of the obtained chromium oxide-$SiO_2$ based ($Cr_xO_y$—SiO2 based) ultraviolet absorbing film was less than 1 μm.

By the thermal treatment, the thin film was changed from light blue to dark green, and the obtained ultraviolet absorbing film was homogeneous, and cracking or delamination was not found.

Transmittance curves of the obtained ultraviolet absorbing film attached substrate and a substrate with no ultraviolet absorbing film are shown in FIG. 10.

In FIG. 10, the dashed line is the transmittance curve of the substrate (with no ultraviolet absorbing film) and the solid line is the transmittance curve of the $Cr_xO_y$—$SiO_2$ based ultraviolet absorbing film attached substrate, and it can be seen that the transmittance of the solid line (with the ultraviolet absorbing film) is markedly inhibited over the entire ultraviolet light region compared to the dashed line (the substrate alone), because absorption by chromium oxide that forms the ultraviolet absorbing film occurs at the ultraviolet light regions of 250-420 nm.

As a result of evaluating the ultraviolet light absorption effect under the same condition as Example 1 using the absorbing film forming coating solution, when the quartz glass substrate G having the ultraviolet absorbing film C was used, the intensity $I_1$ of exit light exiting to the light receiver R side was 0.19 mW/cm$^2$, and a ratio (($I_1/I_0$)×100) of the intensity($I_1$) of exit light exiting to the light receiver R side to the intensity $I_0$ of incident light was 1.9%.

Furthermore, as a result of evaluating the durability under the same condition as Example 1, light was incident on the ultraviolet absorbing film attached quartz glass substrate from the sandpaper polished surface side having the ultraviolet absorbing film C at the incidence angle of 90° with the intensity of 2000 mW/cm$^2$ for 5000 hours as shown in FIG. 9, but cracking or delamination did not in the ultraviolet absorbing film C, and transmittance did not change before and after ultraviolet light radiation.

Example 3

4.1 g of polyvinylpyrrolidone K-90 was slowly added to 85.1 g of 2-methoxyethanol (rational formula: $CH_3OCHCH_2OH$) in a container made of glass, and stirred for 2 hours to dissolve polyvinylpyrrolidone in 2-methoxyethanol. 10.6 g of manganese (II) nitrate hexahydrate (rational formula: $Mn(NO_3)_2 6H_2O$) was added to the solution and stirred for another 2 hours, to prepare 100 g of a very light brown and homogeneous absorbing film forming coating solution (manganese oxide based ($Mn_xO_y$ based)) ultraviolet absorbing paint).

Assume that $Mn_2O_3$ was fully produced from manganese (II) nitrate by thermal treatment of the obtained absorbing film forming coating solution, solids in the same coating solution were 2.9 mass % in $Mn_2O_3$ conversion.

The absorbing film forming coating solution was applied to both surfaces of the slide glass substrate (Matsunami Glass Kogyo, S1127, length 76 mm×width 26 mm×thickness 1.0-1.2 mm) by a dipping method at a pull rate of 20 cm/min. The obtained thin film was colorless, transparent, and homogeneous.

The thin film attached slide glass substrate was dried under the same condition as Example 1, i.e., at 70° C. for 1 hour, and put in a heat treatment furnace, and under the atmospheric environment, at the temperature increased from the room temperature to 500° C. at 200° C./hr and maintaining at 500° C. for 1 hour, a manganese oxide based ($Mn_xO_y$ based) ultraviolet absorbing film having a film thickness of 1.2 μm was formed on the slide glass substrate.

By the thermal treatment, the thin film was changed from colorless transparent to dark brown, and the obtained ultraviolet absorbing film was homogeneous, and cracking or delamination was not found.

Transmittance curves of the obtained ultraviolet absorbing film attached substrate and a substrate with no ultraviolet absorbing film are shown in FIG. 11.

In FIG. 11, the dashed line is the transmittance curve of the substrate alone (with no ultraviolet absorbing film) and the solid line is the transmittance curve of the $Mn_xO_y$ based ultraviolet absorbing film attached substrate, and it can be seen that the transmittance of the solid line (with an ultraviolet absorbing film) is markedly inhibited over the entire ultraviolet light region compared to dashed line (the substrate alone), because absorption of manganese oxide that forms the ultraviolet absorbing film occurs at the ultraviolet light regions of 250-420 nm (furthermore, in FIG. 11, because transmittance of the $Mn_xO_y$ based ultraviolet absorbing film attached substrate was 0% over the entire wavelength region measured, the horizontal axis of FIG. 11 and the transmittance curve of the $Mn_xO_y$ based ultraviolet absorbing film attached substrate are shown as overlapping one another).

As a result of evaluating the ultraviolet light absorption effect under the same condition as Example 1 using the absorbing film forming coating solution, when the quartz glass substrate G having the ultraviolet absorbing film C was used, the intensity $I_1$ of exit light exiting to the light receiver R side was 0.15 mW/cm$^2$, and a ratio (($I_1/I_0$)×100) of the intensity $I_1$ of exit light exiting to the light receiver R side to the intensity $I_0$ of incident light was 1.5%.

Furthermore, as a result of evaluating the durability under the same condition as Example 1, light was incident on the ultraviolet absorbing film attached quartz glass substrate from the sandpaper polished surface side having the ultraviolet absorbing film C at the incidence angle of 90° with the intensity of 2000 mW/cm$^2$ for 5000 hours as shown in FIG. 9, but cracking or delamination did not occur in the ultraviolet absorbing film C, and transmittance did not change before and after ultraviolet light radiation.

Example 4

A mixed solution of 17.1 g of 0.7 mass % aqueous hydrochloric acid and 20.2 g of isopropanol was slowly added to a mixed solution of 25.2 g of tetraethoxysilane (rational formula: $Si(C_2H_{50})_4$) and 20.2 g of isopropanol and stirred for 2 hours, and 17.3 g of manganese (II) nitrate hexahydrate was added and stirred for another 2 hours, to prepare 100 g of a colorless, transparent, and homogeneous absorbing film forming coating solution (manganese oxide-$SiO_2$ based ($Mn_xO_y$—$SiO_2$ based) ultraviolet absorbing paint).

Assume that $Cr_2O_3$ was fully produced from manganese (II) nitrate, and $SiO_2$ was fully produced from tetraethoxysilane by thermal treatment of the obtained absorbing film forming coating solution, solids in the same coating solution contained 20 mol % $Mn_2O_3$ and 80 mol % $SiO_2$, and the solids in the coating solution (assuming that oxide was fully produced by thermal treatment) were 12.0 mass % in 20$Mn_2O_3$.80$SiO_2$ conversion.

The absorbing film forming coating solution was applied to both surfaces of a slide glass substrate (Matsunami Glass Kogyo, S1127, length 76 mm×width 26 mm×thickness 1.0-1.2 mm) by a dipping method at a pull rate of 30 cm/min. The obtained thin film was colorless, transparent, and homogeneous.

The thin film attached slide glass substrate was dried under the same condition as Example 1, i.e., at 70° C. for 1 hour, and put in a heat treatment furnace, and under the atmospheric environment, at the temperature increased from the room temperature to 500° C. at 200° C./hr and maintaining at 500° C. for 1 hour, a manganese oxide-$SiO_2$ based ($Mn_xO_y$—SiO2 based) ultraviolet absorbing film was formed on the slide glass substrate. The film thickness of the obtained manganese oxide-SiO$_2$ based (Mn$_x$O$_y$—SiO$_2$ based) ultraviolet absorbing film was less than 1 μm.

By the thermal treatment, the thin film was changed from colorless transparent to brown, and the obtained ultraviolet absorbing film was homogeneous, and cracking or delamination was not found.

Transmittance curves of the obtained ultraviolet absorbing film attached substrate and a substrate with no ultraviolet absorbing film are shown in FIG. 12.

In FIG. 12, the dashed line is the transmittance curve of the substrate (with no ultraviolet absorbing film) and the solid line is the transmittance curve of the Mn$_x$O$_y$—SiO2 based ultraviolet absorbing film attached substrate, and it can be seen that the transmittance of the solid line (with the ultraviolet absorbing film) is markedly inhibited over the entire ultraviolet light region compared to the dashed line (the substrate alone), because absorption by manganese oxide that forms the ultraviolet absorbing film occurs at the ultraviolet light regions of 250-420 nm.

As a result of evaluating the ultraviolet light absorption effect under the same condition as Example 1 using the absorbing film forming coating solution, when the quartz glass substrate G having the ultraviolet absorbing film C was used, the intensity I$_1$ of exit light exiting to the light receiver R side was 0.21 mW/cm$^2$, and a ratio ((I$_1$/I$_0$)×100) of the intensity I$_1$ of exit light exiting to the light receiver R side to the intensity 10 of incident light was 2.1%.

Furthermore, as a result of evaluating the durability under the same condition as Example 1, light was incident on the ultraviolet absorbing film attached quartz glass substrate from the sandpaper polished surface side having the ultraviolet absorbing film C at the incidence angle of 90° with the intensity of 2000 mW/cm$^2$ for 5000 hours as shown in FIG. 9, but cracking or delamination did not occur in the ultraviolet absorbing film C, and transmittance did not change before and after ultraviolet light radiation.

Comparative Example 1

As a result of evaluating the ultraviolet light absorption effect under the same condition as Example 1 using a commercially available anti-reflective paint (Canon Kasei GT-711) instead of the absorbing film forming coating solution, the intensity I$_1$ of exit light exiting to the light receiver R side was 0.19 mW/cm$^2$, and a ratio (I$_1$/I$_0$)×100) of the intensity I$_1$ of exit light exiting to the light receiver R side to the intensity I$_0$ of incident light was 1.9%.

On the other hand, as a result of evaluating the durability under the same condition as Example 1, color faded away (changed from black to grey) with the passage of irradiation time of ultraviolet light, and delamination occurred in 1000 hours radiation.

The results of Examples 1 to 4 and Comparative Example 1 are summarized in Table 1.

From Table 1, it can be seen that because the ultraviolet absorbing films obtained in Examples 1 to 4 include an oxide of a particular transition metal, even in case that they are used to absorb ultraviolet light in an apparatus for outputting a high intensity of ultraviolet light with high optical energy, it is possible to form an absorbing film that ensures the outstanding durability while markedly inhibiting the generation of stray light in the state of a thin film.

In contrast, from Table 1, it can be seen that in the durability test against ultraviolet light radiation, discoloration or delamination occurs because the coating film obtained from the commercially available anti-reflective paint used in Comparative Example 1 does not include an oxide of a particular transition metal and includes an organic resin.

Example 5

Under the same condition as Example 3 except that the amount of manganese (II) nitrate hexahydrate (rational formula: Mn(NO$_3$)$_2$6H$_2$O) added in Example 3 was changed from 10.6 g to 12.7 g, 100 g of a very light brown and homogeneous absorbing film forming coating solution (manganese oxide based (Mn$_x$O$_y$ based)) ultraviolet absorbing paint was prepared.

Assume that Mn$_2$O$_3$ was fully produced from manganese (II) nitrate by thermal treatment of the obtained absorbing film forming coating solution, solids in the same coating solution were 3.5 mass % in Mn$_2$O$_3$ conversion.

Similar to Example 3, the absorbing film forming coating solution was applied to both surfaces of a slide glass substrate (Matsunami Glass Kogyo, S1127, length 76 mm×width 26 mm×thickness 1.0-1.2 mm) by a dipping method at a pull rate of 5 cm/min. The obtained thin film was colorless, transparent, and homogeneous.

The thin film attached slide glass substrate was dried at 130° C. for 1 hour to change the state of the thin film from colorless transparent to light brown transparent homogeneous, and then put in a heat treatment furnace, and under the atmospheric environment, at the temperature increased from the room temperature to 450° C. at 200° C./hr and maintaining at 450° C. for 1 hour, a manganese oxide based (Mn$_x$O$_y$ based) ultraviolet absorbing film having a film thickness of 1.0 μm was formed on the slide glass substrate.

By the thermal treatment, the thin film was changed from colorless transparent to dark brown immediately after coating, the obtained ultraviolet absorbing film was homogeneous, and cracking or delamination was not found.

Example 6

By the same method as Example 5, after preparing 100 g of a very light brown and homogeneous absorbing film

TABLE 1

|   | Example 1 | Example 2 | Example 3 | Example 4 | Comparative Example 1 |
|---|---|---|---|---|---|
| UV absorbing film | Fe$_x$O$_y$ based | Cr$_x$O—SiO$_2$ based | Mn$_x$O$_y$ based | Mn$_x$O$_y$—SiO$_2$ based | Commercially available anti-reflective paint |
| UV absorbance | 2.0% | 1.9% | 1.5% | 2.1% | 1.9% |
| Durability | No discoloration: No delamination/crack | No discoloration: No delamination/crack | No discoloration: No delamination/crack | No discoloration: No delamination/crack | Discolored Delaminated/cracked (after 1000 hours) | forming coating solution (manganese oxide based ($Mn_xO_y$ based)) ultraviolet absorbing paint) containing 3.5 mass % of manganese (II) nitrate hexahydrate (rational formula: $Mn(NO_3)_2 6H_2O$) in $Mn_2O_3$ conversion, 0.50 g of methylene blue trihydrate as a colorant was added to the same coating solution and stirred at the room temperature for 1 hour, to prepare an absorbing film forming coating solution containing the colorant. The obtained coating solution was dark blue and homogeneous.

Similar to Example 5, the absorbing film forming coating solution was applied to both surfaces of a slide glass substrate (Matsunami Glass Kogyo, S1127, length 76 mm×width 26 mm×thickness 1.0-1.2 mm) by a dipping method at a pull rate of 5 cm/min. The obtained thin film was blue, transparent, and homogeneous.

The thin film attached slide glass substrate was dried at 130° C. for 1 hour similar to Example 5 to change the state of the thin film from blue transparent to light brown tinted blue transparent homogeneous, and then put in a heat treatment furnace, and under the atmospheric environment, at the temperature increased from the room temperature to 450° C. at 200° C./hr and maintaining at 450° C. for 1 hour, a manganese oxide based ($Mn_xO_y$ based) ultraviolet absorbing film having a film thickness of 1.0 μm was formed on the slide glass substrate.

By the thermal treatment, the thin film was changed from blue transparent to dark brown immediately after coating, the obtained ultraviolet absorbing film was homogeneous, and cracking or delamination was not found.

When the absorbing film forming coating solution containing the colorant was applied to the circumferential edge of the lens, a blue transparent coating film was easily formed, and the presence or absence of the coating film could be easily determined. Furthermore, it was possible to easily determine whether or not a slight amount of coating solution was attached to the incident surface and the exit surface of the lens to which the coating solution is disallowed to be attached.

FIG. 13 shows a transmittance curve (dashed line) of a coating film immediately after applying the absorbing film forming coating solution obtained in Example 5 to a slide glass and drying at 130° C. for 1 hour, and shows a transmittance curve (solid line) of a coating film immediately from applying the absorbing film forming coating solution containing a colorant obtained in Example 6 to a slide glass and drying at 130° C. for 1 hour.

From FIG. 13, it can be seen that the coating solution obtained in Example 6 contains a colorant, and has transmittance reductions at visible light regions and visibility improvements.

FIG. 14 shows a transmittance curve (dashed line) of a coating film obtained by applying the absorbing film forming coating solution obtained in Example 5 to a slide glass and drying at 130° C. for 1 hour, followed by thermal treatment, and a transmittance curve (solid line) of a coating film obtained by applying the absorbing film forming coating solution containing a colorant obtained in Example 6 to a slide glass and drying at 130° C. for 1 hour, followed by thermal treatment.

As shown in FIG. 14, both dark brown coating films obtained by applying the absorbing film forming coating solution containing no colorant obtained Example 5 and the absorbing film forming coating solution containing a colorant obtained in Example 6 to slide glasses and drying, followed by thermal treatment, show equivalent transmittance, and thus, it can be seen that even though an absorbing film forming coating solution contains a colorant, the absorbing film forming coating solution does not affect the transmittance of a coating film obtained after thermal treatment.

FIG. 15 shows a transmittance curve (dashed line) of the absorbing film forming coating solution obtained in Example 5 as measured in a cell of acrylic resin having an optical path length of 10 mm, and a transmittance curve (solid line) of the absorbing film forming coating solution containing a colorant obtained in Example 6 as measured in a cell of acrylic resin having an optical path length of 10 mm (In FIG. 15, the transmittance of the absorbing film forming coating solution containing a colorant obtained in Example 6 shows nearly 0% over the entire visible light region and transmittance peaks are nearly in overlapping state with the horizontal axis).

From FIG. 15, an effect of the coating solution having a colorant in Example 6 on transmittance reductions (visibility improvements) at visible light regions can be recognized more clearly, because the thickness of an object to be measured is larger than the coating film measured in FIG. 13.

Example 7

As shown in FIG. 5, an optical unit was formed by arranging 4 UV-LED dies (light emitting wavelength: 395 nm) D with length 1 mm and width 1 mm as a light source on a substrate B close to each other, and installing a first lens L1, a second lens L2 and a third lens L3 from the UV-LED side (light exit side) to the light irradiation side in a sequential order.

As shown in FIG. 5, the ultraviolet absorbing paint prepared in Example 3 was applied to the entire circumferential edge of all the first lens L1, the second lens L2 and the third lens L3, dried at 100° C. for 1 hour, and then put in a heat treatment furnace, and under the atmospheric environment, at the temperature increased from the room temperature to 450° C. at 200° C./hr and maintaining at 450° C. for 1 hour, a manganese oxide based ultraviolet absorbing film having a thickness of 1.5 μm was formed on the circumferential edge.

Subsequently, 25 optical units were arranged in 5×5 on the plane to manufacture a light illuminating apparatus (a light source apparatus for peripheral exposure) as shown in FIG. 6.

Using the light illuminating apparatus, as shown schematically in FIG. 16(A), a peripheral region of a silicon wafer 1 for semiconductor having a photoresist film 1a coated over the entire primary surface at the thickness of 3 μm was exposed (peripheral exposure) under the condition of a cumulative amount of light of 25 mJ, and subsequently, a unnecessary resist film of the wafer peripheral region was removed using a liquid chemical.

In case that the peripheral exposure is performed, it is required to remove the resist film 1a as widely as possible from the periphery (edge portion) of the wafer 1 shown in FIG. 16(A), while it is preferred that an available area of the resist film 1a is as wide as possible, so it is deal to remove the resist film 1a at an area near the outer periphery of the silicon wafer 1 as perpendicularly as possible to form a clean edge portion E (to have a sharp profile) as shown schematically in FIG. 16(B).

In this regard, the silicon wafer 1 obtained by peripheral exposure treatment was removed to form a clean edge portion of the photoresist film (to have a sharp profile) as shown schematically in FIG. 16(C), and a sag width d at the edge portion E (a horizontal width of an area where a slope portion is formed) was 31 μm (about 10 times larger than the film thickness).

Using the light illuminating apparatus for 5000 hours continuously, the photoresist film of the peripheral region of the silicon wafer for semiconductor was exposed, and the obtained silicon wafer was completely removed to form a clean edge portion of the photoresist film (to have a sharp profile), and a sag width d was 30 μm, which was equivalent to that before the continuous use.

Comparative Example 2

An optical unit was formed under the same condition as Example 7 except that none of the first lens, the second lens and the third lens that forms the optical unit in Example 7 have an ultraviolet absorbing film, and subsequently, 25 optical units were arranged in 5×5 on the plane by the same method as Example 7 to manufacture a light illuminating apparatus (a light source apparatus for peripheral exposure).

Using the obtained light illuminating apparatus, under the same condition as Example 5, a peripheral region of a silicon wafer for semiconductor having a photoresist film coated over the entire primary surface at the thickness of 3 μm was exposed (peripheral exposure) under the condition of a cumulative amount of light of 25 mJ, and subsequently, an unnecessary resist film of the wafer peripheral region was removed using a liquid chemical.

The silicon wafer obtained by the foregoing treatment is fabricated by removing an edge portion E of a photoresist film 1 to create a gently sloping sag as shown schematically in FIG. 16(D), and the sag width d was 120 μm (about 40 times larger than the film thickness).

As the silicon wafer is handled while maintaining the peripheral region, if the resist film is coated up to the peripheral region of the wafer, the resist film is peeled off while the wafer is handled, generating a particle, which reduces the yield, so it is required to remove an unnecessary resist film of the wafer peripheral region in advance.

By this reason, in the case of removing the resist film of the silicon wafer peripheral region, in terms of inhibition of particle generation, it is desirable to remove the resist film as widely as possible from the periphery (edge portion) of the silicon wafer, while it is preferred that an available area of the resist film is as wide as possible, so it is required to remove the resist film at an area near the outer periphery of the silicon wafer to form a clean edge portion (to have a sharp profile).

However, conventionally, in the case of removing a resist film by exposure using a light illuminating apparatus, stray light generated from an optical element/optical component such as a lens gets mixed with the original exposed light, causing a gently sloping sag at the edge portion of the resist film.

It can be seen that the light illuminating apparatus obtained in Example 7 ensures the outstanding durability while markedly inhibiting the generation of stray light, because it includes the optical element or the optical unit having the ultraviolet absorbing film according to the present disclosure.

On the other hand, it can be seen that the light illuminating apparatus obtained in Comparative Example 2 cannot inhibit the generation of stray light and cause sagging at the edge portion of the resist film, because it does not include the optical element or the optical unit having no ultraviolet absorbing film according to the present disclosure.

INDUSTRIAL APPLICABILITY

According to the present disclosure, there is provided an ultraviolet absorbing paint for forming a coating film that ensures the outstanding durability while markedly inhibiting the generation of stray light in the state of a thin film, and an ultraviolet absorbing film and a light absorbing film formed from the corresponding ultraviolet absorbing paint, an optical element with the corresponding ultraviolet absorbing film formed on a surface, an optical unit having the corresponding optical element, and a light illuminating apparatus having the corresponding optical unit.

[Detailed Description of Main Elements]

The invention claimed is:

1. An ultraviolet absorbing film that is homogeneous, that absorbs ultraviolet light, and that is provided on an optical element to reduce internal reflections therein, the ultraviolet absorbing film comprising:
    a transition metal oxide of a transition metal selected from the group consisting of Ti, V, Cr, Mn, Fe, Co, Ni, Cu, Zn, Ce, and combinations thereof that contains no organic constituent,
    wherein the ultraviolet absorbing film is formed by a process that comprises:
    (a) applying on at least one surface of the optical element an ultraviolet absorbing paint comprising:
        an oxide precursor of a transition metal selected from the group consisting of Ti, V, Cr, Mn, Fe, Co, Ni, Cu, Zn, Ce, and combinations thereof, which, when heated to a predetermined temperature, forms a transition metal oxide that contains no organic constituent; and
        a binder component or a solvent in which the oxide precursor is dissolved and which substantially completely decomposes or volatilizes at the predetermined temperature at which the oxide precursor forms the transition metal oxide on the at least one surface of the optical element to provide a coating; and
    (b) heating the coating to the predetermined temperature at which the oxide precursor forms the transition metal oxide and the binder or the solvent substantially completely decomposes or volatilizes so that the transition metal oxide contains no organic constituent, and the ultraviolet absorbing film is homogeneous, absorbs ultraviolet light, and reduces internal reflection in the optical element.

2. The ultraviolet absorbing film according to claim 1, further comprising an adhesion promoter that is a silicon oxide, an aluminum oxide, or a combination thereof.

3. A light absorbing film that is a laminate comprising a stack of (a) the ultraviolet absorbing film according to claim 2 and (b) a visible light absorbing film or an infrared light absorbing film.

4. The ultraviolet absorbing film according to claim 1, wherein the transition metal oxide of the transition metal is present in an amount of 20-100 mass %.

5. A light absorbing film that is a laminate comprising a stack of (a) the ultraviolet absorbing film according to claim 4 and (b) a visible light absorbing film or an infrared light absorbing film.

6. The ultraviolet absorbing film according to claim 1, wherein the ultraviolet absorbing film has a film thickness that is 50 μm or less.

7. A light absorbing film that is a laminate comprising a stack of (a) the ultraviolet absorbing film according to claim 6 and (b) a visible light absorbing film or an infrared light absorbing film.

8. A light absorbing film that is a laminate comprising a stack of (a) the ultraviolet absorbing film according to claim 1 and (b) a visible light absorbing film or an infrared light absorbing film.

9. An optical unit comprising the optical element according to claim 1.

10. A light illuminating apparatus comprising the optical unit according to claim 9.

11. A method of providing an ultraviolet absorbing film, that is homogenous and absorbs ultraviolet light, on at least one surface of an optical element to reduce internal reflections therein, the method comprising the steps of:
(a) providing an ultraviolet absorbing paint that comprises:
an oxide precursor of a transition metal selected from the group consisting of Ti, V, Cr, Mn, Fe, Co, Ni, Cu, Zn, Ce, and combinations thereof, which, when heated to a predetermined temperature, forms a transition metal oxide that contains no organic constituent; and
a binder component or a solvent, in which the oxide precursor is dissolved and which substantially completely decomposes or volatilizes at the predetermined temperature at which the oxide precursor forms the transition metal oxide;
(b) applying the ultraviolet absorbing paint onto to the at least one surface of the optical element to provide a coating; and
(c) heating the coating to the predetermined temperature at which the oxide precursor forms the transition metal oxide and at which the binder or the solvent substantially completely decomposes or volatilizes so that the transition metal oxide contains no organic constituent, and the ultraviolet absorbing film is homogeneous and absorbs ultraviolet light.

12. The method according to claim 11, wherein the oxide precursor of the at least one transition metal is a metal salt, a metal acid salt, or an organic metal compound.

13. The method according to claim 11, wherein the oxide precursor of the at least one transition metal is present in an amount of 0.5-20.0 mass %, in transition metal oxide conversion.

14. The method according to claim 11, wherein the ultraviolet absorbing paint further comprises an adhesion promoter that is a silicon oxide precursor, an aluminum oxide precursor, or combinations thereof.

15. The method according to claim 11, wherein the ultraviolet absorbing paint further comprises a colorant.

16. The method according to claim 11, wherein the predetermined temperature at which the oxide precursor forms the transition metal oxide ranges from 300 to 1,000° C.

* * * * *